United States Patent
Sakamoto et al.

(10) Patent No.: US 7,869,441 B2
(45) Date of Patent: *Jan. 11, 2011

(54) VARIABLE LENGTH PACKET COMMUNICATION DEVICE

(75) Inventors: Kenichi Sakamoto, Tokyo (JP); Nobuhito Matsuyama, Hadano (JP); Takeshi Aimoto, Sagamihara (JP); Noboru Endo, Kodaira (JP); Koji Wakayama, Kokubunji (JP); Norihiko Moriwaki, Kokubunji (JP)

(73) Assignees: Hitachi, Ltd., Tokyo (JP); Hitachi Information Technology Co., Ltd., Kanagawa (JP)

( * ) Notice: Subject to any disclaimer, the term of this patent is extended or adjusted under 35 U.S.C. 154(b) by 1104 days.

This patent is subject to a terminal disclaimer.

(21) Appl. No.: 10/919,393

(22) Filed: Aug. 17, 2004

(65) Prior Publication Data

US 2005/0078673 A1   Apr. 14, 2005

Related U.S. Application Data

(63) Continuation of application No. 09/362,134, filed on Jul. 28, 1999, now Pat. No. 6,836,479.

(30) Foreign Application Priority Data

Dec. 9, 1998 (JP) .................. 10-349587
Feb. 25, 1999 (JP) .................. 11-047588

(51) Int. Cl.
   *H04L 12/28* (2006.01)
(52) U.S. Cl. ..................................... 370/396
(58) Field of Classification Search .......... None
   See application file for complete search history.

(56) References Cited

U.S. PATENT DOCUMENTS

| | | | | | |
|---|---|---|---|---|---|
| 5,473,603 | A | * | 12/1995 | Iwata | 370/426 |
| 5,555,266 | A | * | 9/1996 | Buchholz et al. | 370/347 |
| 5,740,373 | A | * | 4/1998 | Isaka | 709/237 |
| 5,878,045 | A | | 3/1999 | Timbs | |
| 6,052,368 | A | * | 4/2000 | Aybay | 370/357 |
| 6,167,445 | A | | 12/2000 | Gai et al. | |
| 6,275,491 | B1 | * | 8/2001 | Prasad et al. | 370/389 |
| 6,735,190 | B1 | * | 5/2004 | Chuah et al. | 370/352 |

FOREIGN PATENT DOCUMENTS

| | | |
|---|---|---|
| JP | 5-227211 | 9/1993 |
| JP | 8-65307 | 3/1998 |

OTHER PUBLICATIONS

IEEE Micro, vol. 17, No. 1, Jan./Feb. 1997, "The Tiny Tera: A Packet Switch Core," pp. 26-33.

* cited by examiner

*Primary Examiner*—Raj K Jain
(74) *Attorney, Agent, or Firm*—Mattingly & Malur, P.C.

(57) ABSTRACT

An input interface segments a variable length packet into plurality of fixed length cells and generates an internal switching information based on the header information of the variable length packet. The input interface transmits the information to a switch and, after that, transmits the cells as the following cells of the information to the switch. The switch performs switching processing to the succeeding cells based on the information. Therefore, the information is not added to the cells. When an input interface starts to transmit cells generated from a packet to its destination output interface through the switch, the switch is reserved until all the cells arrive at the output interfaces.

10 Claims, 22 Drawing Sheets

VARIABLE LENGTH PACKET COMMUNICATION DEVICE

This is a continuation application of U.S. Ser. No. 09/362,134, filed Jul. 28, 1999 now U.S. Pat. No. 6,836,479.

FIELD OF THE INVENTION

This invention is related to a router which switches a variable length packet.

BACKGROUND OF THE INVENTION

By the Internet's popularization, the data traffic rapidly increases recently. In order to deal with the increase, enlargement of capacity of a communication channel, speedup and enlargement of capacity of a communication device, such as an exchange node, is important.

A conventional variable length packet communication device has structure that interfaces and a microprocessor are connected to a bus. When a packet arrives at one of the interfaces, the interface transmits the packet to the microprocessor and the microprocessor analyzes the packet and transmits the packet to the desirable route. However, the bus and microprocessor are the bottleneck to perform a processing at high speed.

It is also used a switching device that performs the switching in packet units, like a frame relay. The device assigns and releases switch resources in variable length packet units. In the device, however, it is necessary to monitor the packet transmission completion in byte units, and to control the assignment in byte units. Therefore, since the control processing is a bottleneck, it is hard to construct a large capacity packet switch.

It also appeared a relatively high speed packet communication device that used as the switch core, a switch like what it is disclosed in "The Tiny Tera: A Packet Switch Core," IEEE Micro, Vol. 17, No. 1, 1997, pp. 26-33 (Reference (1)). Reference (1) disclose that the input interface divides the packet into fixed length cells and transmits the cells to the core switch. The core switch transmits the cells to a desirable route, and the output interface for output reassembles the cells into the packets.

Japanese Unexamined Patent Publication Disclosure 5 (1993)-227211 (Reference (2)) discloses a technique for dividing the variable length packet into a plurality of small packets, adding the internal header for indicating the destination to each of the small packets and after that transmitting the small packets to the switch. The switch performs ATM (asynchronous transfer mode) switching to the small packets based on the internal header. After that, in output side, the small packets are assembled into the variable length packet. A path is set up between the source channel and the destination channel through the switch. While a packet is transmitted through the path, the path is fixed and transmission from another channel holds being waited.

Japanese Unexamined Patent Publication Disclosure 8 (1996)-65307 (Reference (3)) discloses a technique for generating switching information from destination information included in packets and sending them to the switch. The switch performs switching based on the switching information. The packet assembling part converts sent information to packets, attribute information indicating the lead packet and destination information in the case of the first packet, but attribute information indicating the packets other than the first packet in the case of following packets.

SUMMARY OF THE INVENTION

In the technique disclosed in Reference (1), the switch is occupied in cell units, and cells arrive at an output interface in such a manner as to be interleaved from a plurality of input interfaces. Therefore, the output interface has to have a plurality of queues corresponding to the number of input interfaces, store cells from their respective input interfaces into their respective queues, and reassemble the cells into the packet in respective queue like CLAD of ATM exchange. Accordingly, the amount of hardware increases.

On the other hand, in the technique for Reference (2), at output side, buffers corresponding to input interfaces are not necessary.

In the technique, however, each of the small packets has a field for indicating its destination. There is more overhead because the field occupies relatively large part of the small packet. This decreases the throughput of the switch.

The technique for Reference (3) is related to an application of ATM switching. Moreover, Reference (3) does not mention the way that does not create the state that packets arrive at the packet disassembling part in such a manner as to be interleaved from a plurality of packet assembling parts.

An object of this invention is providing a router that the throughput of the switch is high and the amount of hardware is small.

And in order to deal with increasing Internet traffic, a router with large capacity is necessary at the backbone. Although that router has to have a switch with large capacity therein, in order to make that switch, parallel processing in the switch is effective. Generally, since throughput of a switch depends on internal clock frequency of the switch times the number of bits to be processed in parallel, increasing the number of bits to be processed in parallel can realize the switch with large capacity. This requires increasing the number of bits of processing unit in the switch. However, even if a packet is divided into plurality of cells and the switch performs switching process cell by cell, the number of parallel processing bits is under restriction caused by the cell size.

Another object of this invention is providing a router that can perform parallel processing in switch effectively.

In the present invention, an input interface segments a variable length packet into plurality of fixed length cells and generates a cell (switch control cell) indicating the output path based on the head information of the variable length packet. That is, the cell has switching establishment information. The input interface transmits the switch control cell as the head cell to a switch and, after that, transmits the cells as the following cells of the switch control cell to the switch. The switch performs switching processing to the succeeding cells based on switching establishment information of the head cell. Therefore, the switching establishment information is not added to the cells.

In the present invention, switch is reserved in packet units. That is, when an input interface starts to transmit cells generated from a packet to its destination output interface through the switch, the switch is reserved until all the cells arrive at the output interfaces. In other words, the output interface does not receive any cell from another input interfaces until all the cells arrive at the output. However, the switch may transmit a packet to be transmitted to an output interface different from the output interface. In such way, the variable length communication device reassembles the cells into the packet by queuing the cells in arrival order at the output interface. And, in the present invention, due to adding the field for indicating the output route to only the head cell, there is less overhead in switch and less the amount of hardware in transmitting interface side. Moreover, in this invention, since a switch on/off operation itself is performed cell by cell, there is less load of scheduler of the switch.

In the another present invention, a packet container containing a packet/packets is provided. An input interface has a plurality of queues, each of which corresponds to each of the output interfaces respectively. The input interface stores packets into the their respective queues and stuffs a packet/packets to be transmitted to the same output interface into the same container in such a manner as a packet does not extend over two containers. The switch performs switching by the containers. The output interface takes the packet/the packets from the container and transmits the packet to the transmission path. This facilitates reassembling a packet at the output interface. Moreover, using the container facilitates large capacity of the switch, since unit of switching and the number of parallel processing bits increase.

Moreover, in the another present invention, a fixed length container is provided. An input interface permits a packet to extend over a plurality of containers. An input interface has a plurality of queues, each of which corresponds to each of the output interfaces respectively. The input interface stores packets into their respective queues and stuffs a packet/packets to be transmitted to the same output interface into the same container. At the time, a packet may extend over two containers. The switch performs switching in container units. The output interface takes the packet/the packets from the container and transmits the packet to the transmission path. In this case, the output interface has packet reassembling buffers that correspond to input interfaces respectively in order to reassemble the packet that extends over two containers. This facilitates large capacity of the switch. Moreover, since packets are stuffed into a container without consideration the end of each packet and without a PAD, efficiency of the switch is promoted.

DETAILED DESCRIPTION OF THE PREFERRED EMBODIMENT

We explain a packet communication device of a first, second and third embodiment of the present invention.

Figure 17:
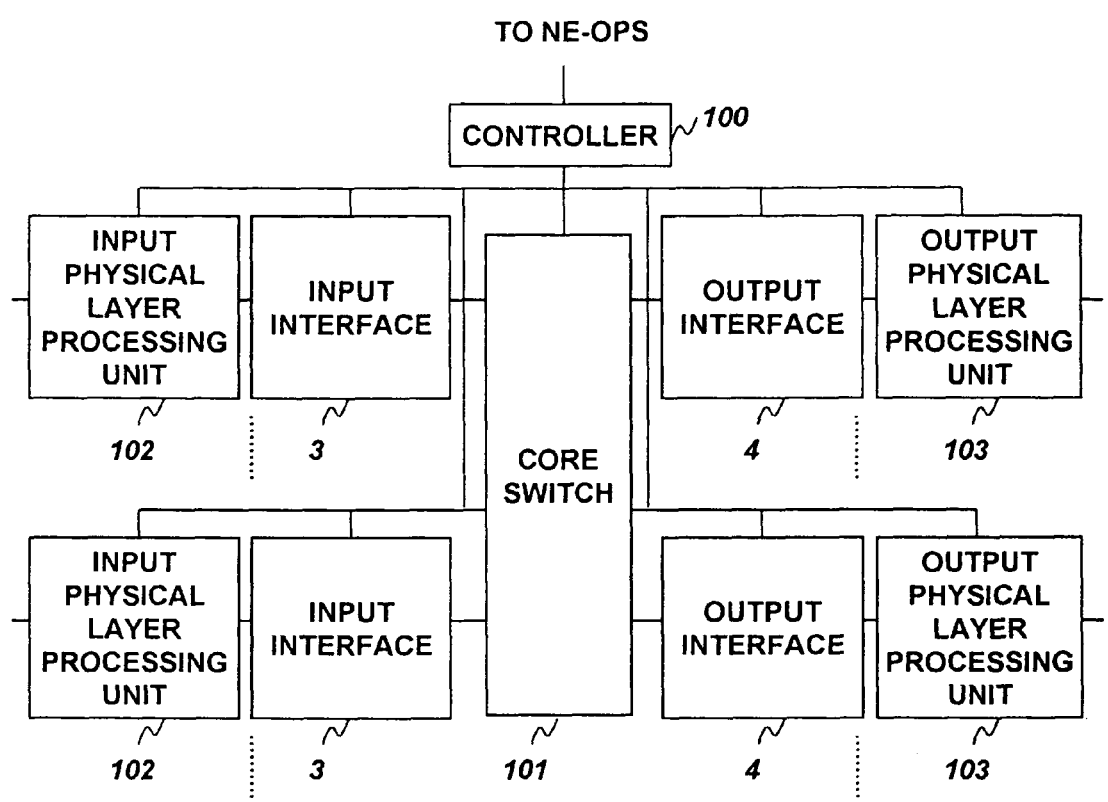
FIG. 17 is a common block diagram for a packet communication device of a first, second and third embodiment of the present invention.
Figure 18:
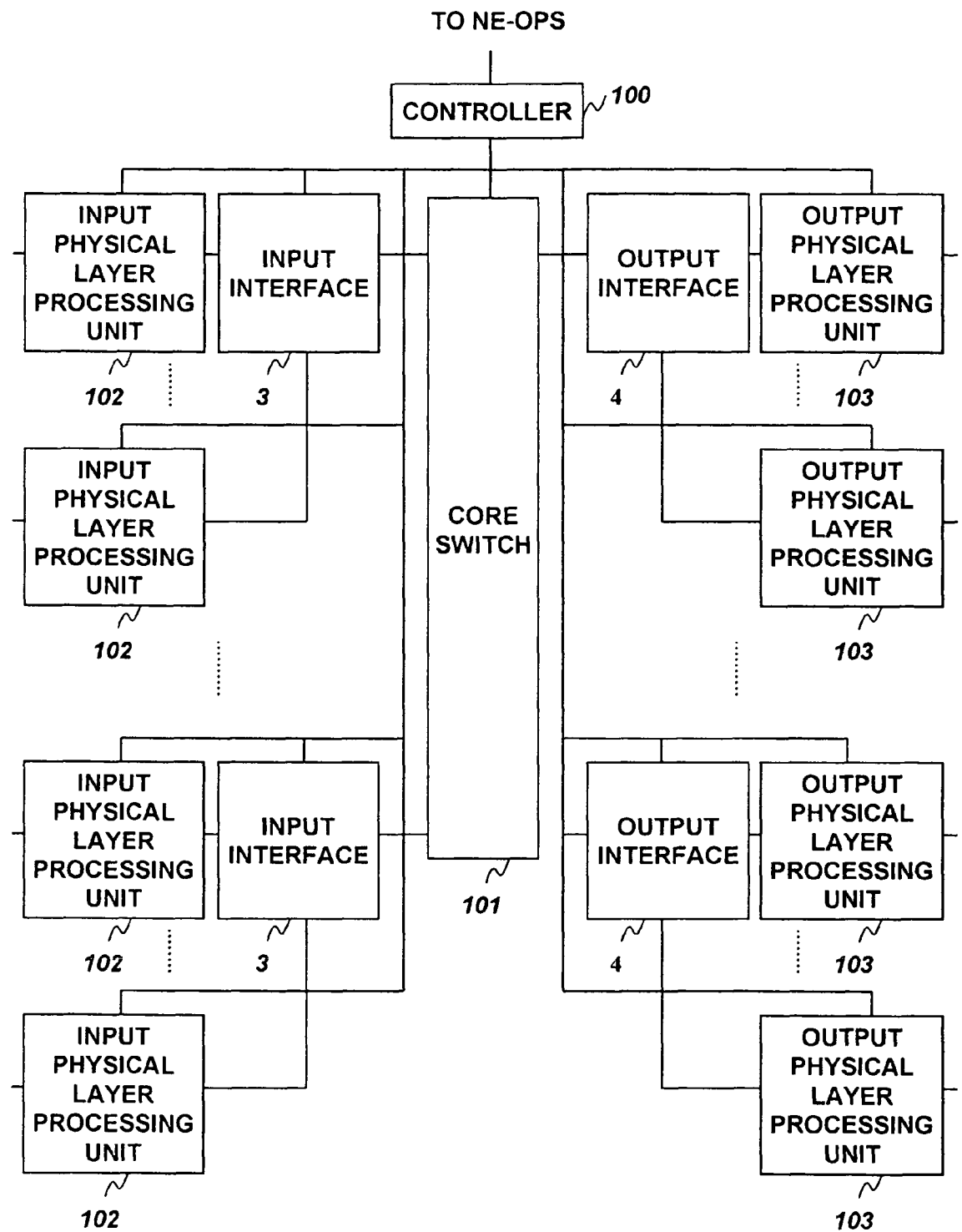
FIG. 18 is another common block diagram for a packet communication device of a first, second and third embodiment of the present invention.

First of all, using FIG. 17 and FIG. 18, we explain a common block diagram for a packet communication device of a first, second and third embodiment of the present invention.

A packet communication device shown in FIG. 17 is comprising input physical layer processing unit 102, input interface 3, core switch 101, output interface 4, input physical layer processing unit 103 and controller 100. Input physical layer processing unit 102 performs terminated processing of the physical layer of an input variable length packet. Input interface 3 decides the output path of the packet. Core switch 101 transmits the packet to the desired path. Output interface 4 performs transmission processing for the packet. Input physical layer processing unit 103 performs processing of the physical layer of the packet such as putting the packet in a frame. Controller 100 performs setting up each of above units, monitors each of above units and performs an operation on each of above units.

FIG. 18 shows another common block diagram for a packet communication device of a first, second and third embodiment of the present invention. A plurality of input physical layer processing units 102 are connected to input interface 3, and input interface 3 processes variable length packets from a plurality of transmission paths.

Hereinafter, we explain the respective embodiment using figures.

Embodiment 1

Figure 1:
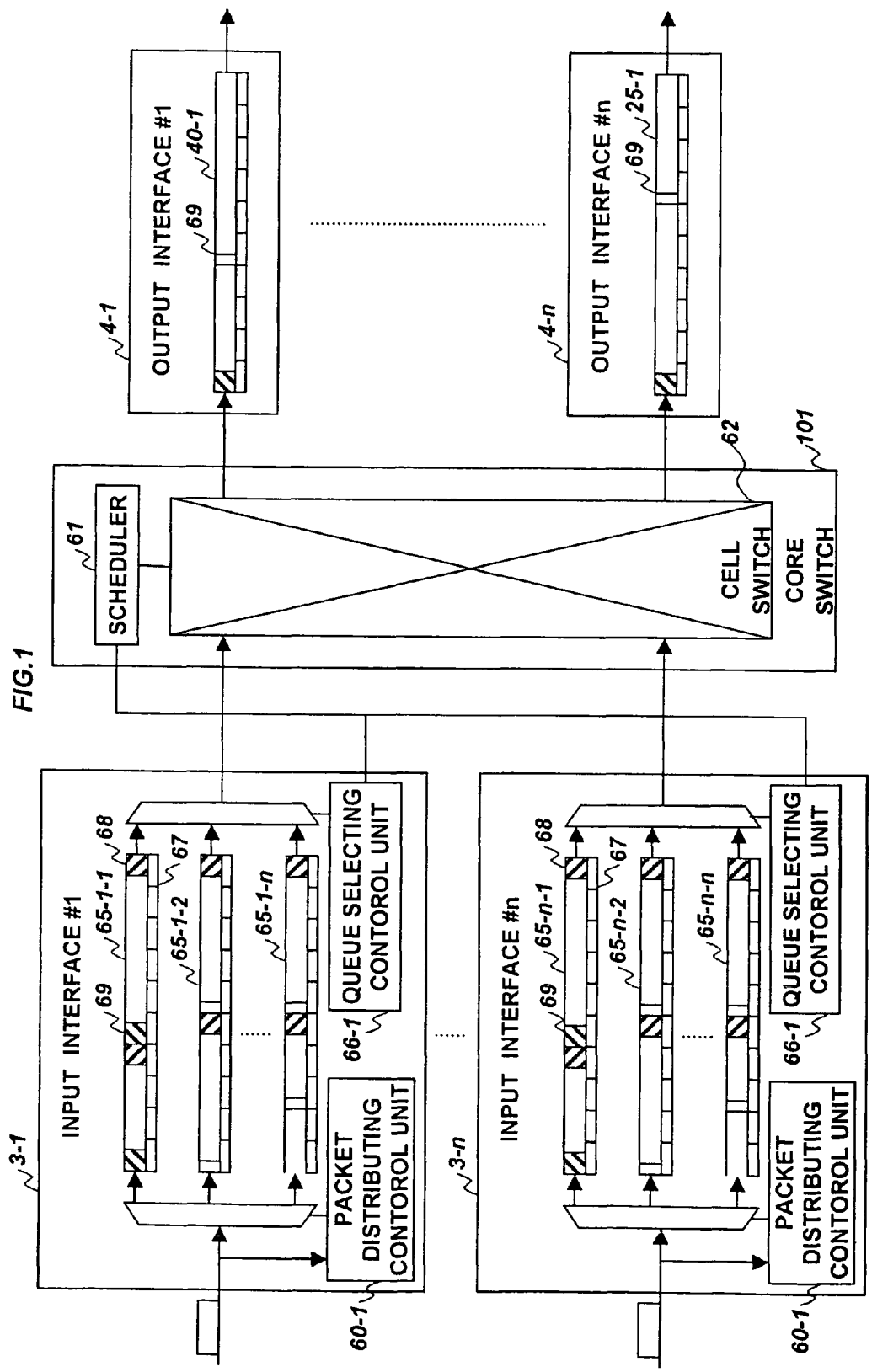
FIG. 1 is a schematic view for a packet communication device of a first embodiment of the present invention.

FIG. 1 is a schematic view for a packet communication device of a first embodiment of the present invention. FIG. 1 shows input interface 3, core switch 101 and output interface 4 in detail. Cell switch 62, for example, is composed of a crossbar switch. Each of interfaces has "n" queues 65 corresponding to n output interfaces 4 respectively, packet distributing control unit 60, and queue selecting control unit 66. The number of "n" is the number of output interfaces 4. Packet distributing control unit 60 specifies the output interface 4 to which the input variable length packet is to be transmitted based on the header information of the input packet and distributes the input packet to the corresponding queue 65. Queue selecting control unit 66 selects one of the n queues 65 and transmits the variable length packet queued in it to cell switch 62. Each of output interfaces 4 has a queue 40. Hereinafter, a variable length packet may be called a packet.

One of the futures of a communication device according to the present invention is that the input interface segments an input packet into a plurality of fixed length cells. A cell means a fixed length data, does not limited to ATM cell. Hereinafter, the fixed length cell may be called a cell.

Figure 13:
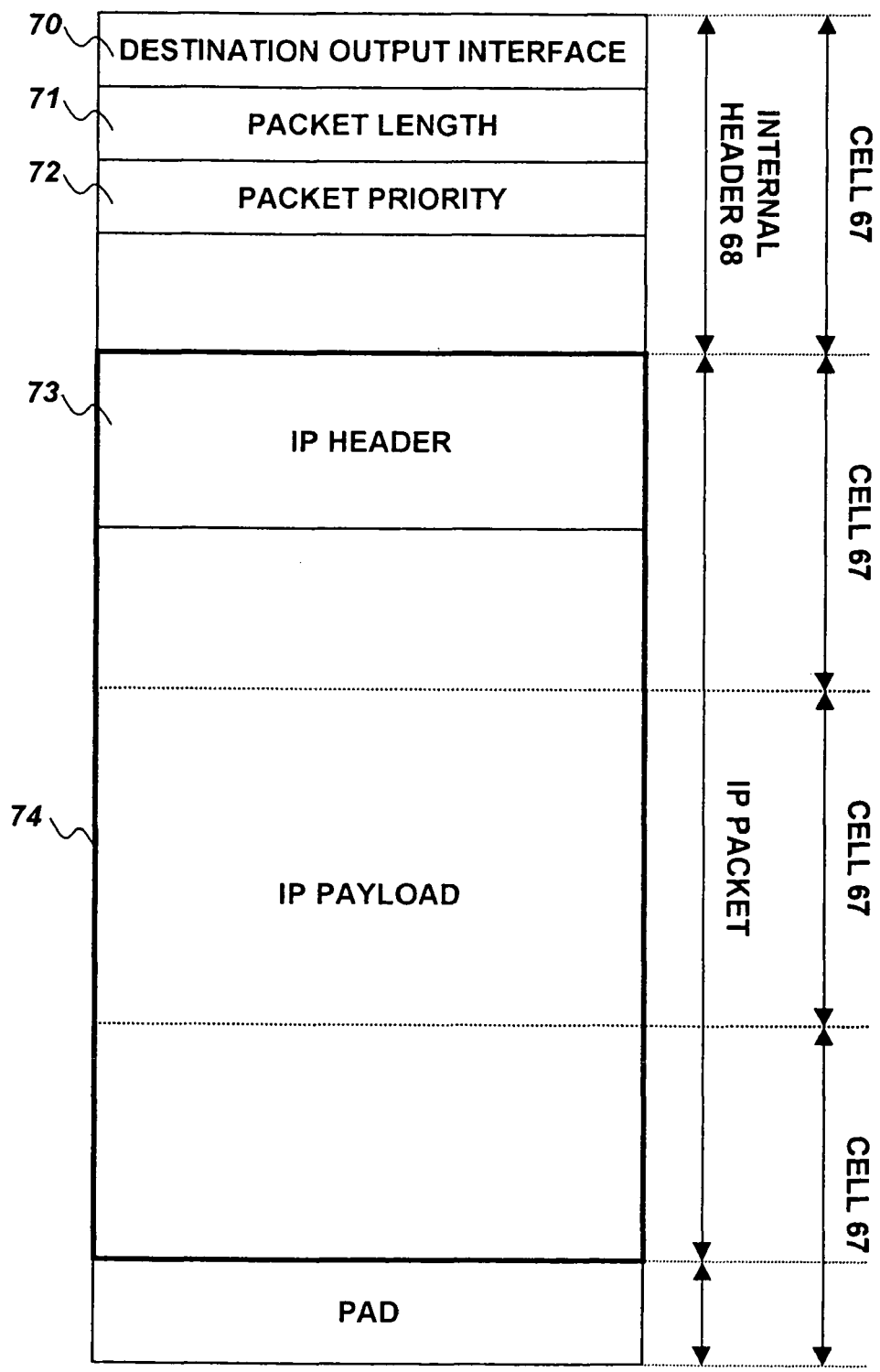
FIG. 13 is a packet format that is used at the time when a packet communication device of a first embodiment of the present invention segments into internal cells.
Figure 14:
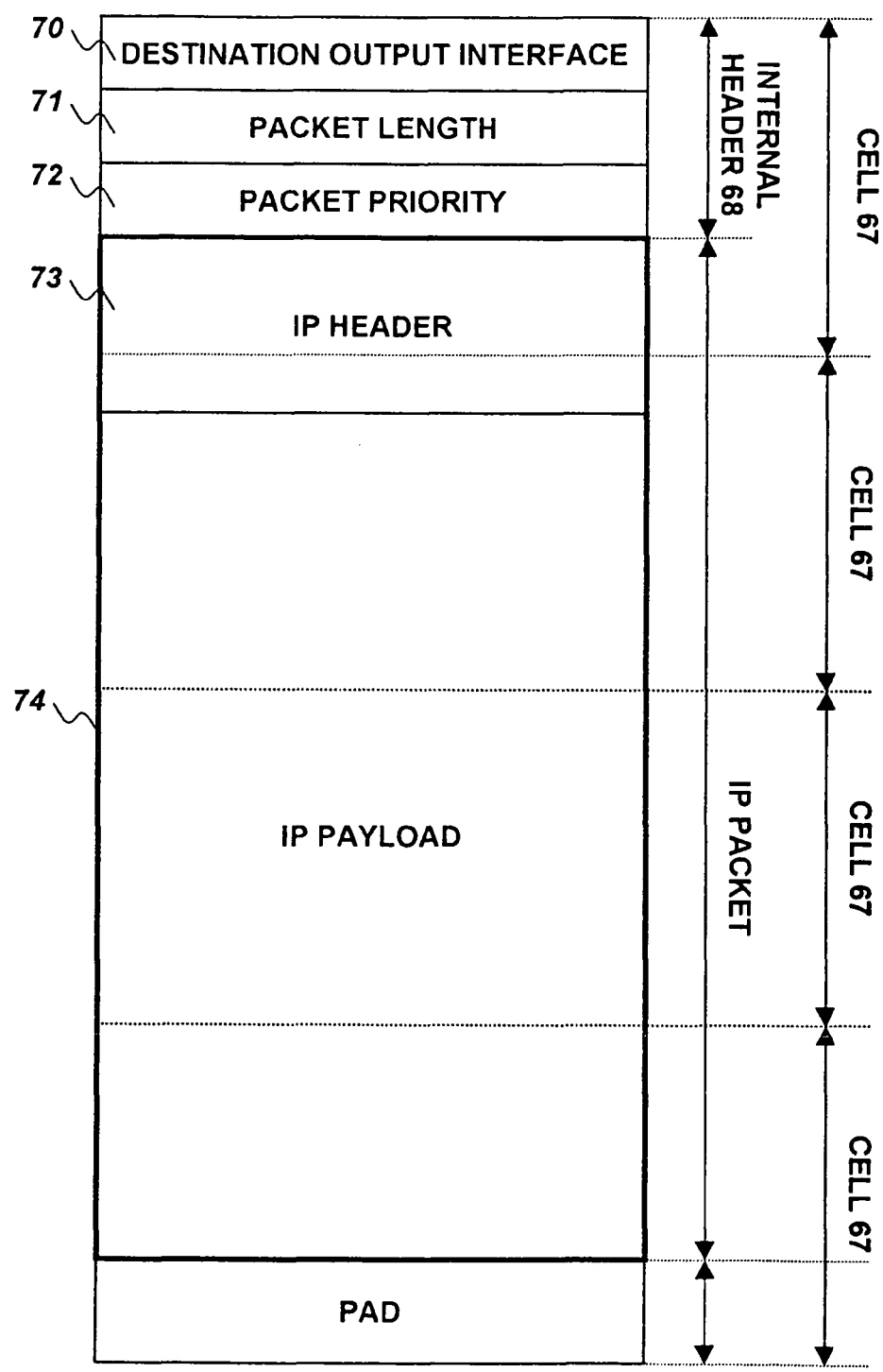
FIG. 14 is another packet format that is used at the time when a packet communication device of a first embodiment of the present invention segments into internal cells.
Figure 15:
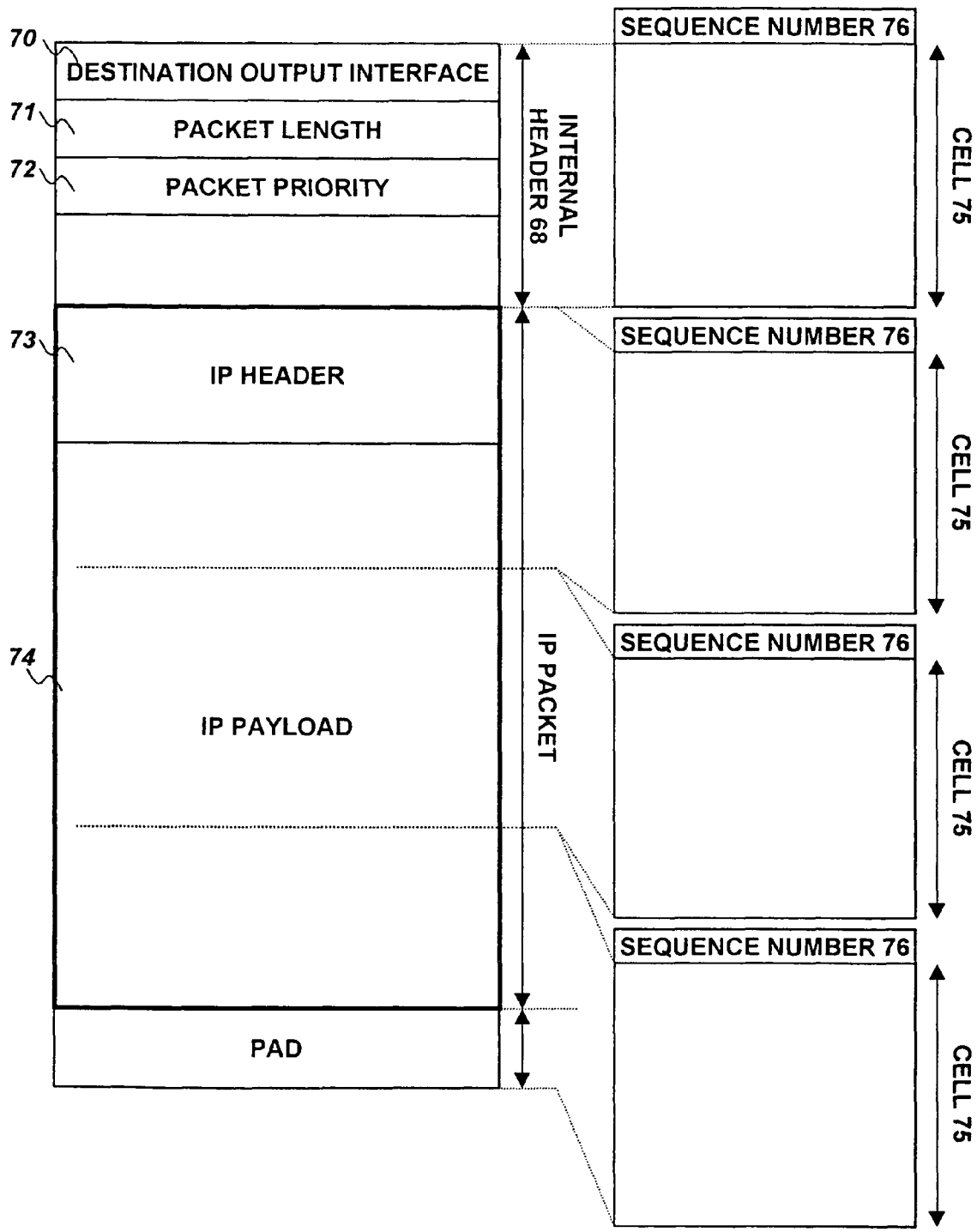
FIG. 15 is another packet format that is used at the time when a packet communication device of a first embodiment of the present invention segments into internal cells.

Using from FIG. 13 through FIG. 15, we explain the segmentation of a packet into cells.

FIG. 13 shows a packet format that is used at the time when a packet communication device of a first embodiment of the present invention segments into internal cells. The format provides internal header 68, which functions as switching establishment information, at the head and a plurality of cells after internal header 68. Pad 69 is inserted into the last cell 67 if the length of input packet 74 is not constant times as long as the cell length.

Internal header 68 is generated as follows. Each of output path distribution 60 decides the output interface based on IP (Internet protocol) header 73 of input packet 74, counts the packet length and generates internal header 68 having the field indicating destination interface 70 and packet length 71 thereby. In stead of packet length 71, the number of necessary cells to be segmented a packet into, may be used. Moreover, the field indicating priority class of the input packet is provided in internal header 68 and priority processing may be performed based on the information of the field. We will explain the priority processing in detail.

As shown in FIG. 13, only the head cell has the information of the destination interface, succeeding cells does not have any header including the information and trailer information. Therefore, the overhead reduces in comparison with the case of not so. Accordingly, the throughput of the switch does not reduce.

FIG. 14 shows another packet format that is used at the time when a packet communication device of a first embodiment of the present invention segments into internal cells. Although, the head cell 67 is composed of only internal header 68 in the format shown FIG. 13, a part of the input packet 74 is put into the head cell 67 if the length of internal header 68 is short. This is deferent from the format shown in FIG. 13.

FIG. 15 shows another packet format that is used at the time when a packet communication device of a first embodiment of the present invention segments into internal cells. Although, in the format shown in FIG. 13 and FIG. 14, any cells 67 except for the head cell does not have header information and trailer information, in the format shown in FIG. 15, each of cells 75 has cell sequence number 76 detecting an error or an error detecting code. In this format, any cells 67 except for the head cell also does not have destination output interface information. Therefore, the communication quality increases due to error detecting means, and the overhead reduces in comparison with the case of not so. In case of adding an error detecting code, the error code may be added the last cell. Moreover, Although FIG. 15 shows a example that the last cell is recognized with packet length 71 in the head cell, the head cell ID and the last cell ID may be put in internal header 68.

We refer FIG. 1 again. As above, an input packet is segmented into cells. FIG. 1 shows that input packets are queued in queues 65 in each of input interfaces 3. The upper section of each of queues 65 shows packets and the lower section of each of the queues shows cells 67, the cell being the unit of segment. Number 69 is a PAD. Queue selecting control unit 66 selects a packet to be transmitted, input interface 3 transmits internal header 68 as the head cell to cell switch 62 according to the command from queue selecting control unit 66. Cell switch 62 receives the internal header 68 sets up the path between the input interface transmitting the packet and the output interface that the packet is to be transmitted based on the information of the internal information 68. Cell switch 62 transmits the succeeding cells continuously after setting up the path. During this, cell switch 62 does not transmit any cell to be transmitted from the other input interfaces to the output interface. That is, any cell to be transmitted from the other input interfaces to the output interface, is hold at its respective input interface 3. Since, in consequence, the cells segmented from the packet arrives at the output interface continuously, each of output interfaces can reassemble the cells into the packet with one queue. Therefore, there is less the amount of hardware. However, cell switch 62 may transmit a packet to be transmitted to an output interface different from the output interface. For example, a crossbar switch can perform transmission in parallel, that is, set different paths simultaneously.

Figure 21:
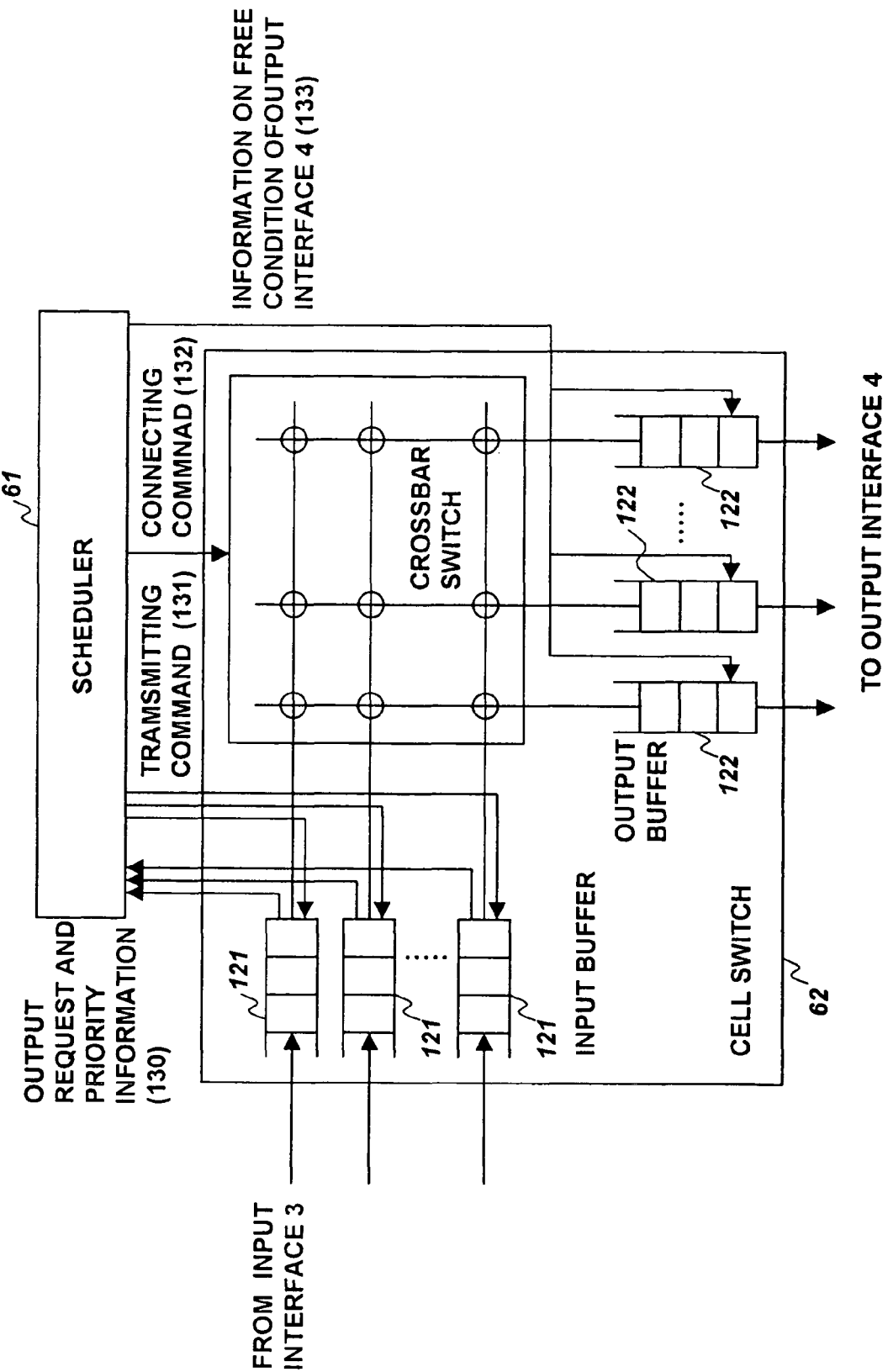
FIG. 21 is a schematic view for a core switch of a packet communication device of a first embodiment of the present invention.

Using FIG. 21, we explain the switching in more detail. FIG. 21 shows cell switch 62 in detail. Input interface 3 transmits a part/all of a packet into input buffer 121 in cell switch 62. Scheduler 61 reads out the head cell, the internal header 68, from input interface 3 (130). Next, Scheduler 61 commands the crossbar switch to turn the contacts on/off according to the information of the internal header (132) switches the packet. After all cells from a packet are transmitted, scheduler 61 releases the contacts. If there are a plurality of transmission requests from a plurality of input interfaces 3 to same output interface 4, scheduler 61 transmit a packet with high priority prior to the other packets. If a plurality of packets are with same priority, scheduler 61 decides a packet to be transmitted by weighted round robin (WRR) scheduling. We explain WRR later. After deciding the path, internal header 68 is discarded at either cell switch or output interface 4.

The path through internal header 68 and the path through the others may be different. For example, control line connecting between input interface 3 and scheduler 61 may be provided.

Although internal header 68 is arranged at the head of cells in queue 65, in stead of that arrangement, input interface 3 may have another memory to store the switching establishment information internal header 68 and transmit the information when the cells generated from a packet.

By the way, a cell switch like a crossbar switch creates the problem, HOLE (head of line blocking). This happens when a plurality of input interfaces intend to transmit packets to the same output interface simultaneously. The phenomenon is as follows. Even if the output interface to be hold the transmit, have the succeeding packet to be transmitted to a different output interface, the input interface can not transmit the succeeding packet because the input interface can not transmit the previous packet. Therefore, the throughput of the switch is reduced.

One way to prevent HOLE, is to use scheduler 61. Scheduler 61 always monitors whether the communication condition of output interfaces 4 is free, notifies the free condition to queue selecting control unit 66 of input interfaces 3 shown in FIG. 1. queue selecting control unit 66 selects a queue that stores the packet to be transmitted to the output interfaces that scheduler 61 instructs.

Referring FIG. 21 again, we explain the way to prevent HOLE. Scheduler 61 recognizes the busy condition of all of output interfaces 4. Receiving internal header 68 from input interface 3, the scheduler 61 adds the information to internal header 68 and transmits the internal header 68 with the information to output interface 4. If input interface 3 and output interface 4 connected to a same network node, are installed a same card, output interface 4 transmits the information to queue selecting control unit 66 of the interface 4 installed same card. Queue selecting control unit 66 selects a queue with free condition prior and interface 3 transmits the packet queued in the selected queue.

We explain how to transmit the information to input interface 3 in detail. Scheduler 61 notifies the information to each of output buffers 122. The information is written into internal header 68 at output buffer 122. Output interface 4 retrieves the information from internal header 68 and transmits it to the input interface 3 installed on the same card. According to this way, control line to transmit the busy/free condition of output interface 4, each of which is connected between core switch 101 and input interface 3 respectively, is not always necessary. It is also not always necessary to provide a pin to be connected to the control line with the card that a pair of interface 3 and interface 4 is installed on. Therefore, this way prevents creating the problem that the number of pins of the card becomes short.

Even if input interface 3 and output interface 4 connected to a same network node, are installed a same card, core switch 101 may be connected to each of interfaces 3 by its respective control line. Core switch 101 may transmit the information to the each or interface 3 through the control line.

Another way to prevent HOLE is that queue selecting control unit 66 monitors the condition of queues 65 (request condition) of in interface 3 and transmits the result to scheduler 61. Scheduler 61 indicates a packet to be transmitted to each of input interface 3 based on the request conditions from input interface 3 and the free condition of output interface 4. Input interface 3 transmits the packet indicated by scheduler 61. This way also prevents HOLB.

Figure 2:
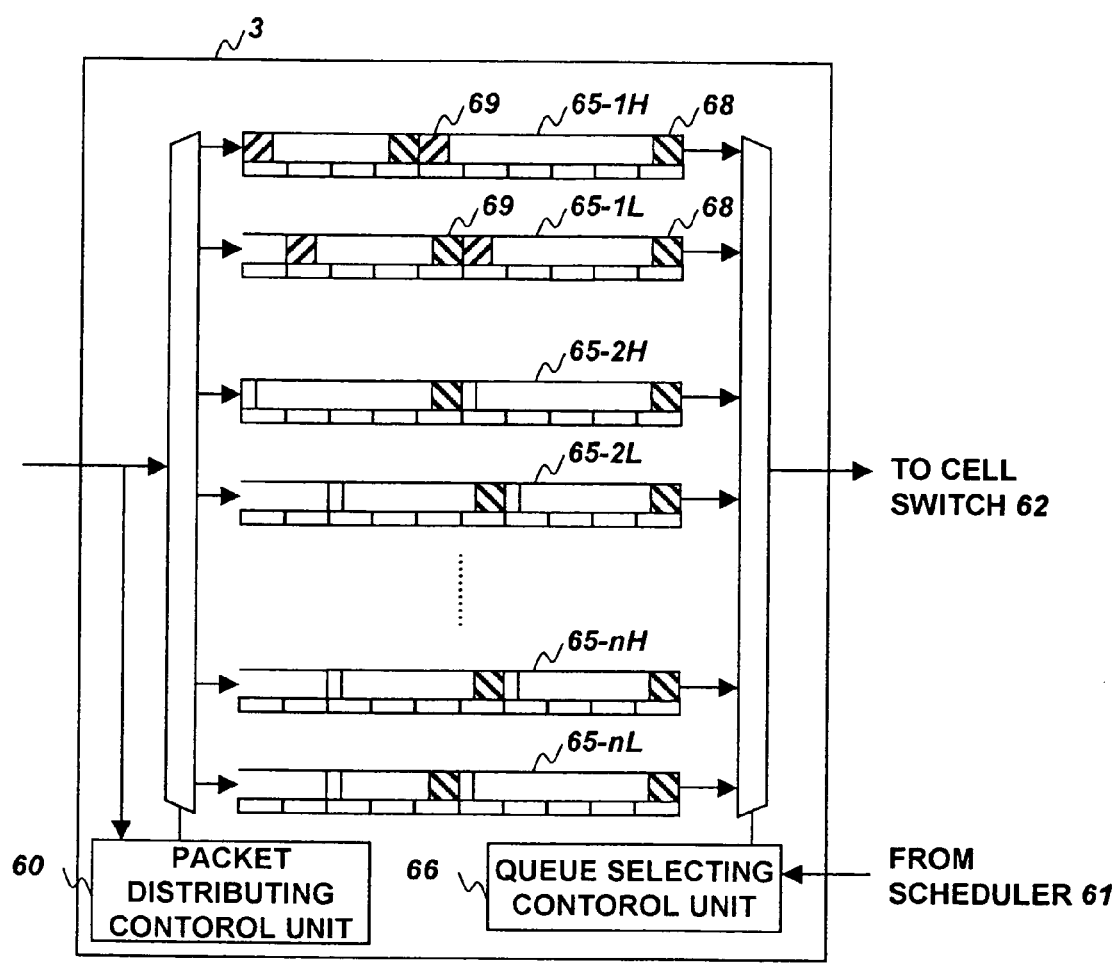
FIG. 2 is a schematic view for an input interface of a packet communication device of a first embodiment of the present invention.

Next, we explain priority transmission of the embodiment. There exist some cases network users want to transmit specific packet prior to the others, for example, a packet that flows in VPN (Virtual Private Network), a packet that encapsulates a moving data, which requires real time. Using FIG. 2, we explain the priority transmission of the embodiment. Input interface 3 has a plurality of queues to accommodate packets to be transmitted to the same output interface 4, the queues corresponding to priority. Suppose two classes, high and low, in priority. Queue 61-1H accommodates a packet with high priority to be transmitted to output interface #1 and queue 61-1L accommodates a packet with low priority to be transmitted to output interface #1. That is, queues of input interface 3 is 2 times "n", wherein "n" is the number of output queues 4. Packet distributing control unit 60 also decides priority of a packet and distributes a packet to its respective queue. A queue to accommodate a packet with high priority is selected prior to a queue to accommodate a packet with low priority by queue selecting control unit 66.

Figure 19:
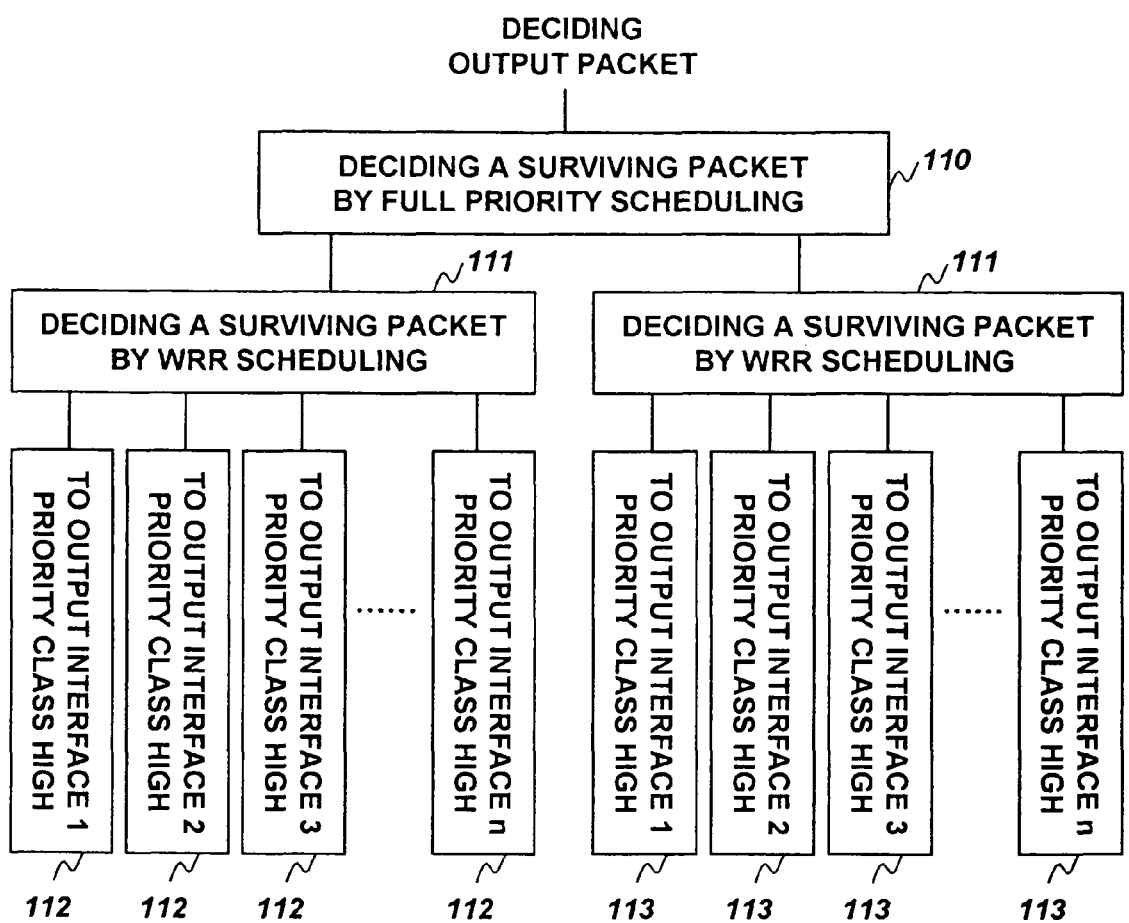
FIG. 19 is an algorithm for deciding an outputting packet at an input interface of first embodiment of the present invention.

Using FIG. 19, we explain a priority transmission algorithm of this embodiment. Firstly, a candidate for output packet is decided among packets (112) with high priority by WRR scheduling. WRR @scheduling means that if input interface #1 is more heavily weighted than the others, then the ratio of the assignment of transmission of input interface #1 to the assignment of transmission of the other is "m" to one, wherein the number of "m" is greater than one. A candidate for output packet is also decided among packets (113) with low priority by WRR scheduling (111). Then an output packet is decided among the candidates by full priority scheduling (110). Full priority scheduling means that a packet with high priority is always selected prior to a packet with low priority and, if there is no packet with high priority, a packet with low priority is selected.

Figure 20:
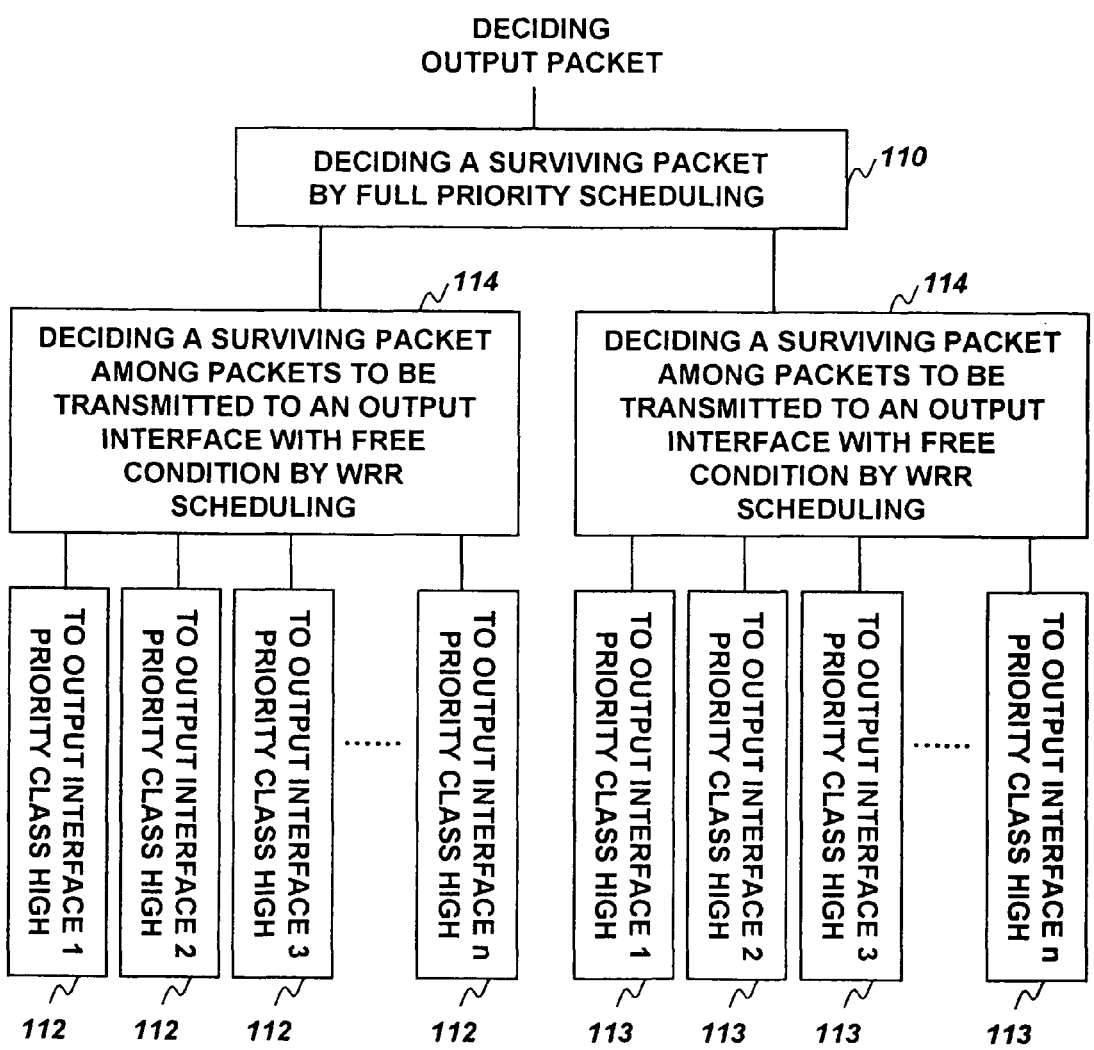
FIG. 20 is another algorithm for deciding an outputting packet at an input interface of first embodiment of the present invention.

Using FIG. 20, we explain a priority transmission algorithm with feedback information that notifies busy condition of output interfaces 4. Firstly, a candidate for output packet is decided among packets (112) with high priority output interfaces of which are free condition by WRR scheduling, and a candidate for output packet is decided among packets (113) with low priority output interfaces of which are free condition by WRR scheduling (114). Then an output packet is decided among the candidates by full priority scheduling (110).

If packets are to be transmitted to the same output interface 4, a priority transmission algorithm is as above mentioned.

Figure 16:
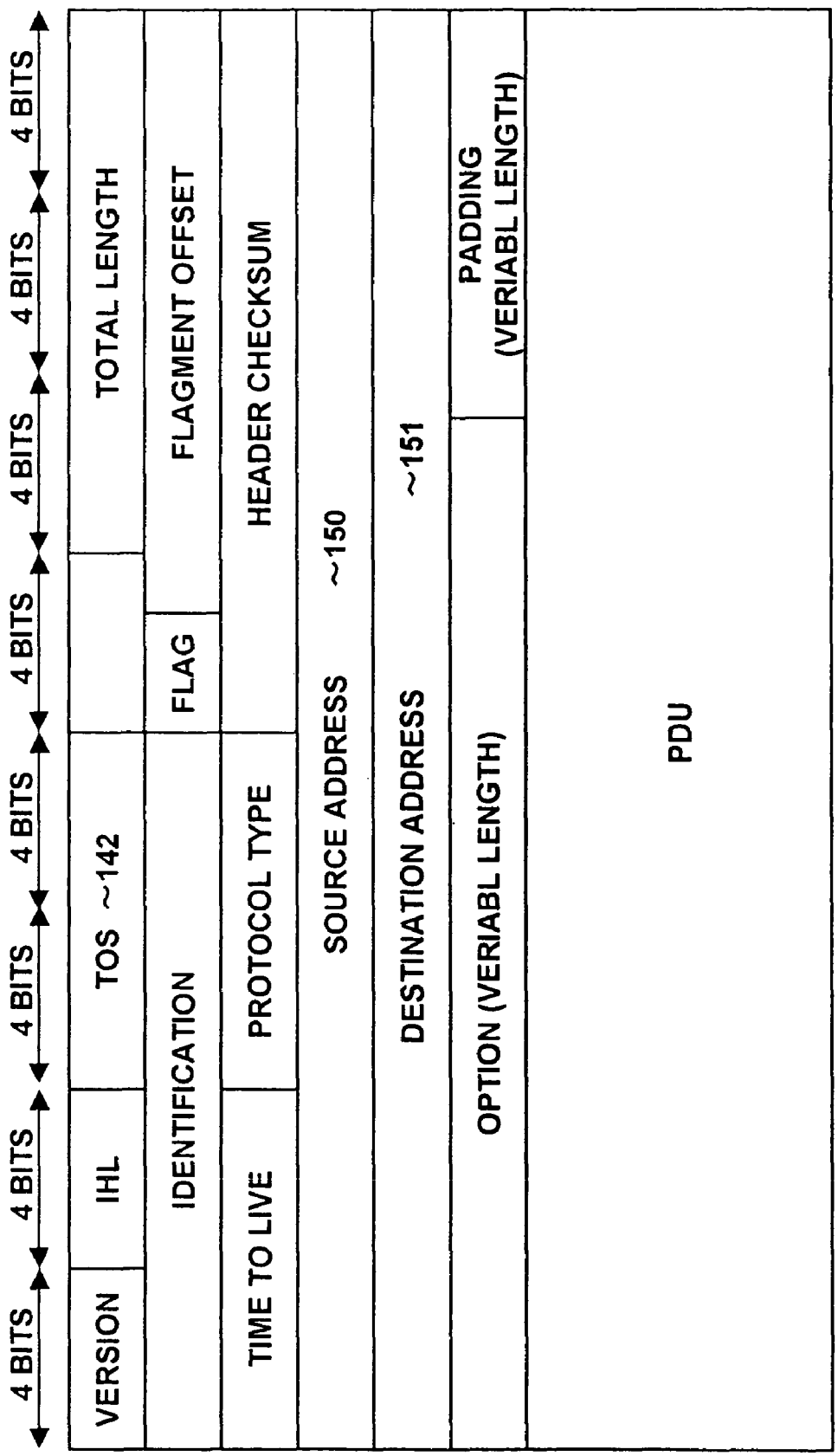
FIG. 16 is IPv4 frame format.

Packet distributing control unit 60 makes decision about priority by the information that IP packet header has. Herein, IP packet header means IP header and TCP (transmission control protocol) header. FIG. 16 shows the TP packet format. To be concrete, the information to decide priority is, in TP header, such as TOS (type of service) field 142, source address 150, destination address 151 and, in TCP header, such as a port number.

Embodiment 2

Figure 3:
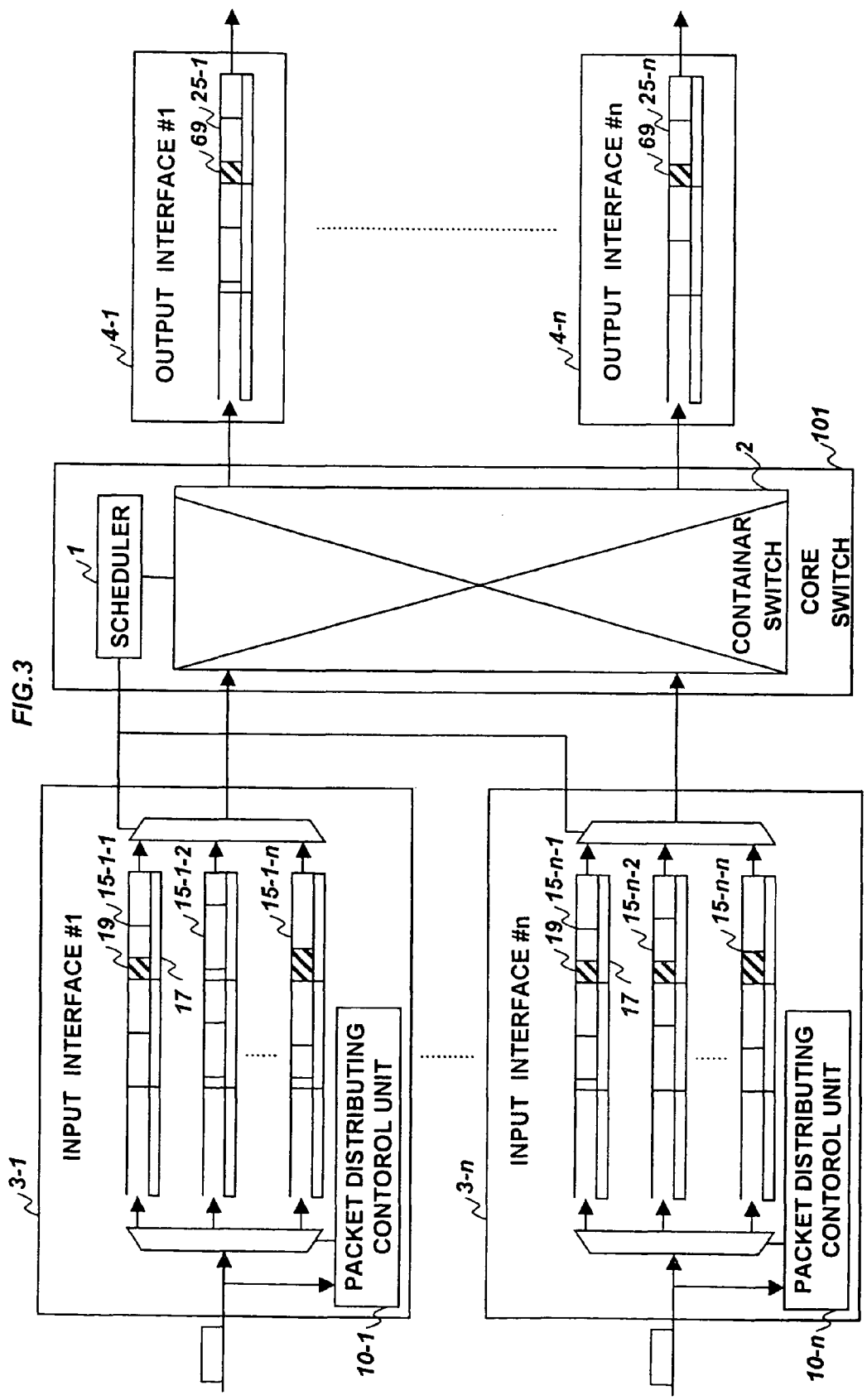
FIG. 3 is a schematic view for a packet communication device of a second embodiment of the present invention.

FIG. 3 is a schematic view for a packet communication device of a second embodiment of the present invention. In this embodiment, input interfaces 3 generates a container to be put a packet/packets to be transmitted to the same output interface 4. Container switch 2 in core switch 101 performs switching in container units. Container switch 2 reserves/releases the switch resource by a time slot, which is the time a container is through container switch 2. Output interface 4 retrieves the packet/the packets from the container and transmits the packet/the packets to the transmission line connected to output interface 4.

Each of input interfaces 3 has "n" queues 15 corresponding to output interfaces 4 respectively and packet distributing control unit 10 that distributes a input packet to queue 15 based on its destination. Herein, the number of "n" is the number of output interfaces 4. The upper section of each of queues 15 shows packets and the lower section of each of the queues shows containers 17. A container 17 generated at each of queues 15. A container includes a packet/packets. If the length of the packet/the packets is short of the length of the container, PAD 19 is inserted. Even if there is space for more packets in a container, the container may be generated 2 by inserting PAD 19 after predetermined time passes from the arrival of the first packet. After generating of a container, input interface 3 transmits a request for transmission ready to scheduler 1. Then scheduler 1 permits each of interfaces 3 to transmit the container to be transmitted to specific output interfaces 4 respectively. Each of input interfaces 3 transmits the container to the specific output interfaces 4 respectively. Output interface 4 retrieves the packet from the container and transmits the packet to transmission path. Since, in this embodiment, the switching is performed in container units and the size of container is big, this is suitable for constructing a switch with large capacity. And since, in this embodiment, a packet does not extend over two containers, a packet can be reassembled by only one queue 25.

Figure 4:
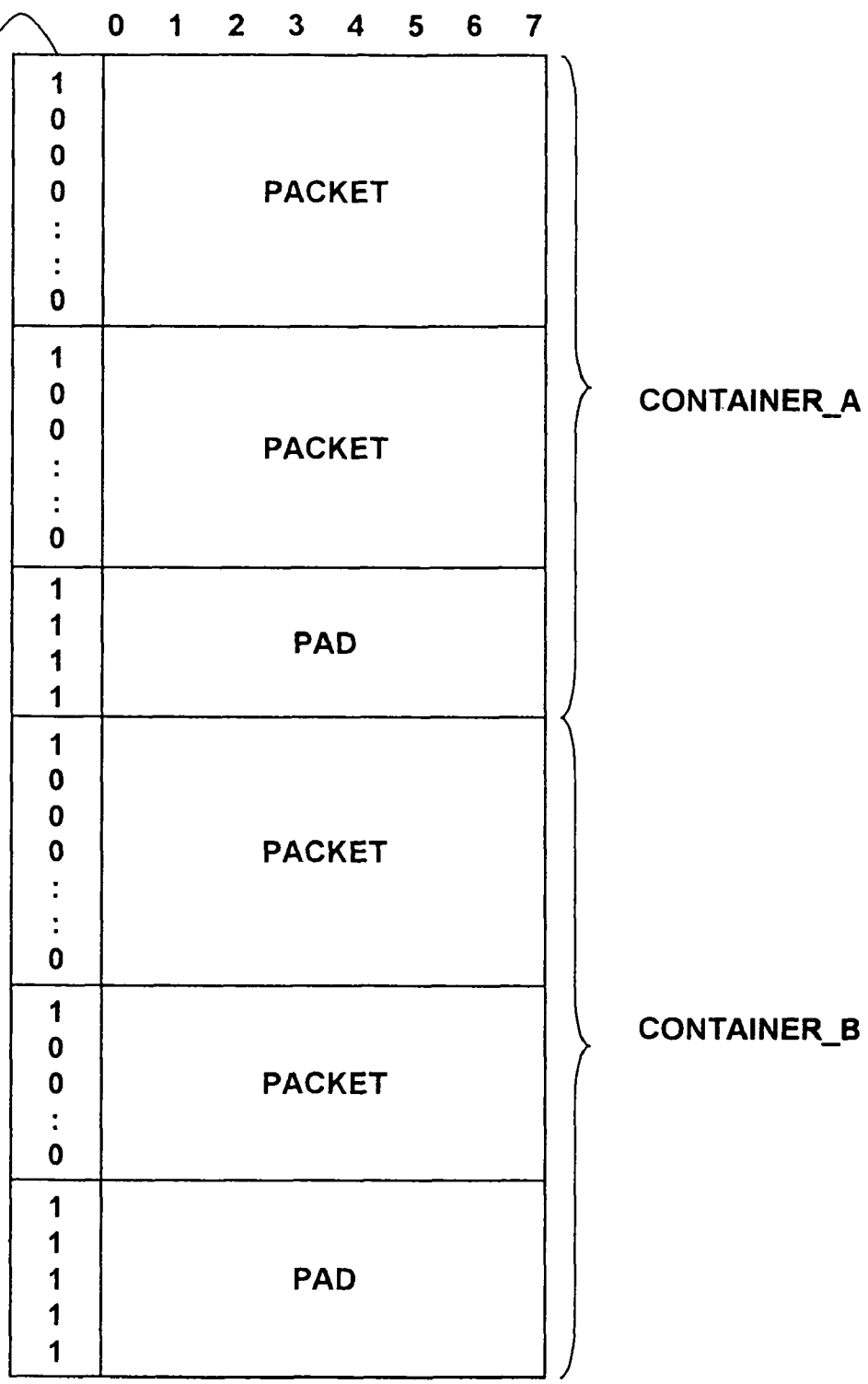
FIG. 4 is a container format used by a packet communication device of a second embodiment of the present invention.

FIG. 4 shows a container format used by a packet communication device of a second embodiment of the present invention. To retrieve a packet from a container at output interface 4, discrimination of the boundary between packets is important. In this embodiment, discrimination flag 31 to discriminate the head of the packet is provided with a packet in byte units. Flag "1" is set for the head of the packet, flag "0" is set for the others of the packet, and flag "1" is set for PAD. Therefore, discrimination flag 31 identifies a boundary between packets and a boundary between a packet and a PAD.

Figure 5:
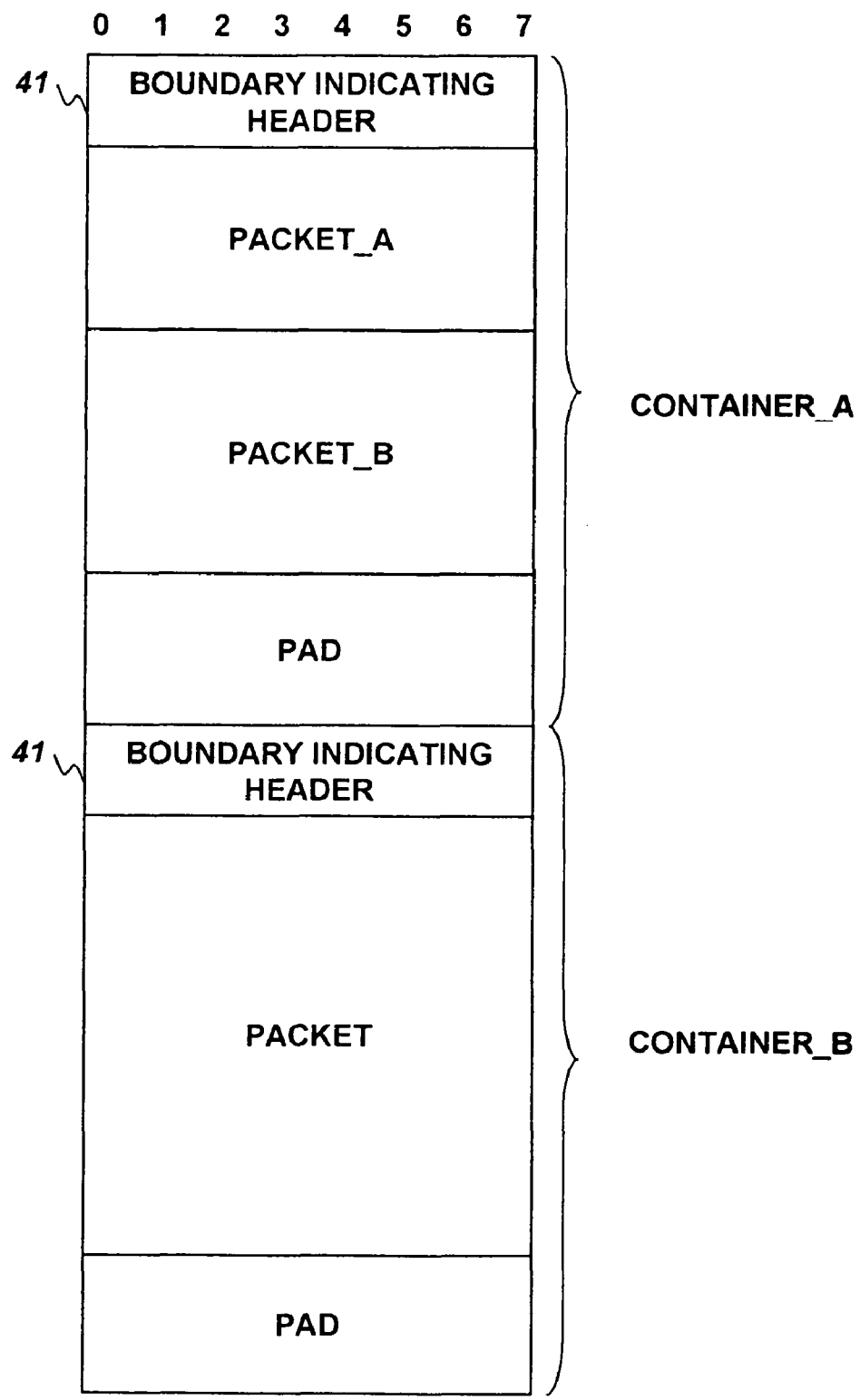
FIG. 5 is another container format used by a packet communication device of second embodiment of the present invention.

FIG. 5 shows another container format used by a packet communication device of second embodiment of the present invention. In this embodiment, boundary indicating header 41 is provided with the head of the container. Boundary indicating header 41 is a bit-map. "1" is set for the first one byte of the packet, "0" is set for the other bytes of the packet and "1" is set for PAD. Suppose that the size of packet_A, packet_B and PAD of container_A are four bytes, six bytes and two bytes respectively, boundary indicating header 41 of container_A is "100010000011". Therefore, boundary indicating header 41 identifies a boundary between packets and a boundary between a packet and a PAD.

Using code violation like PPP (Point to point protocol) also may attain the discrimination.

Figure 6:
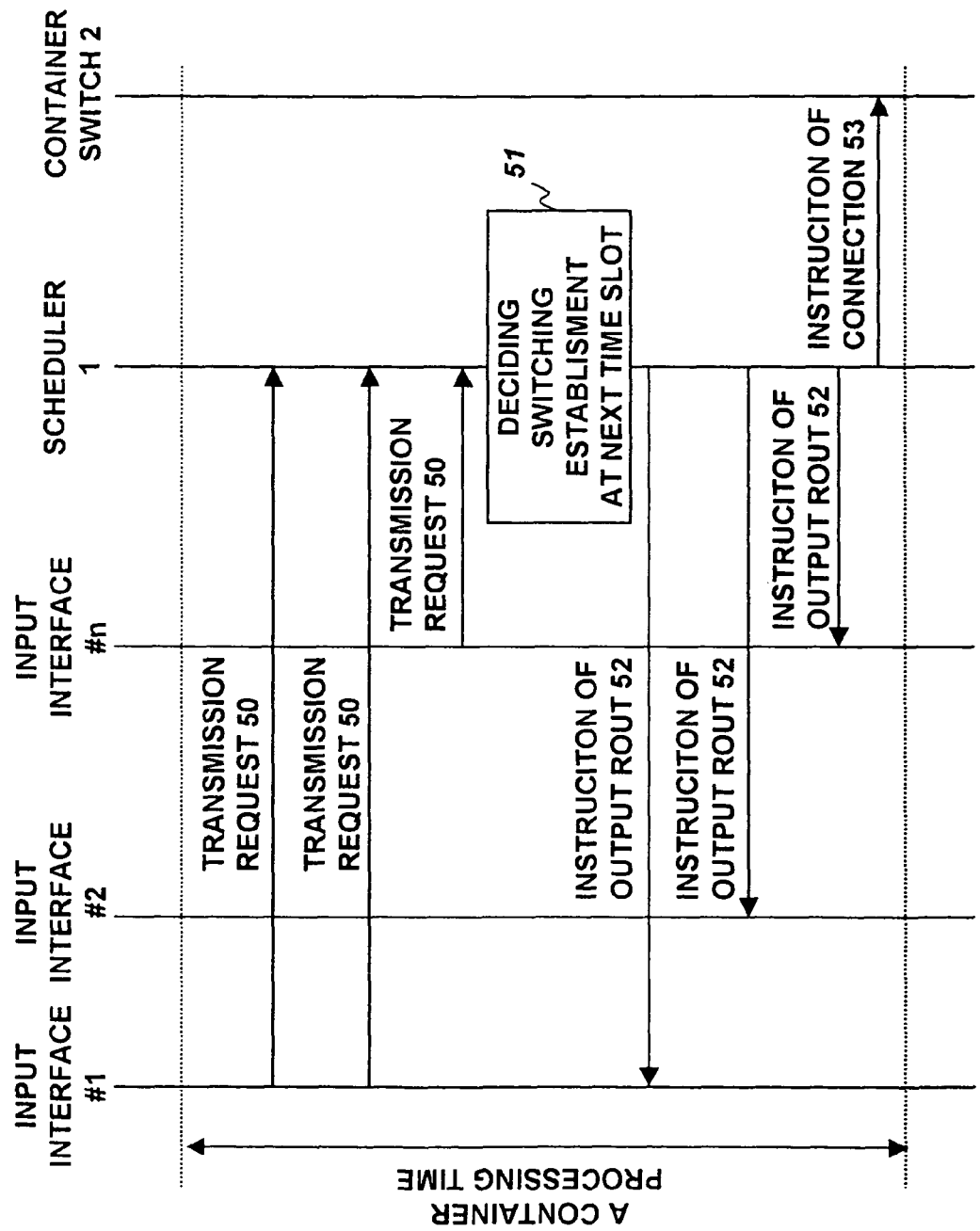
FIG. 6 is a time chart of switching of a packet communication device of a second embodiment of the present invention.

FIG. 6 shows a time chart of switching of a packet communication device of a second embodiment of the present invention. The processing synchronizes container processing time of container switch 2. Firstly, each of input interfaces 3 transmits container transmission request 50 in order to decide its respective container to be transmitted from each of input interfaces 3 to container switch 2 at next time slot. Scheduler 1 decides switching establishment at next time slot (51) and instructs which output interface 4 input interface 3 may transmit a packet to (52). And scheduler 1 also indicates the switching establishment to the container switch 2 (53). Input interface 3 and container switch 2 transmits a container according to the indication.

In stead of the above, scheduler may perform predetermined scheduling (pre-scheduling system) without accepting a request from input interface 3.

Figure 22:
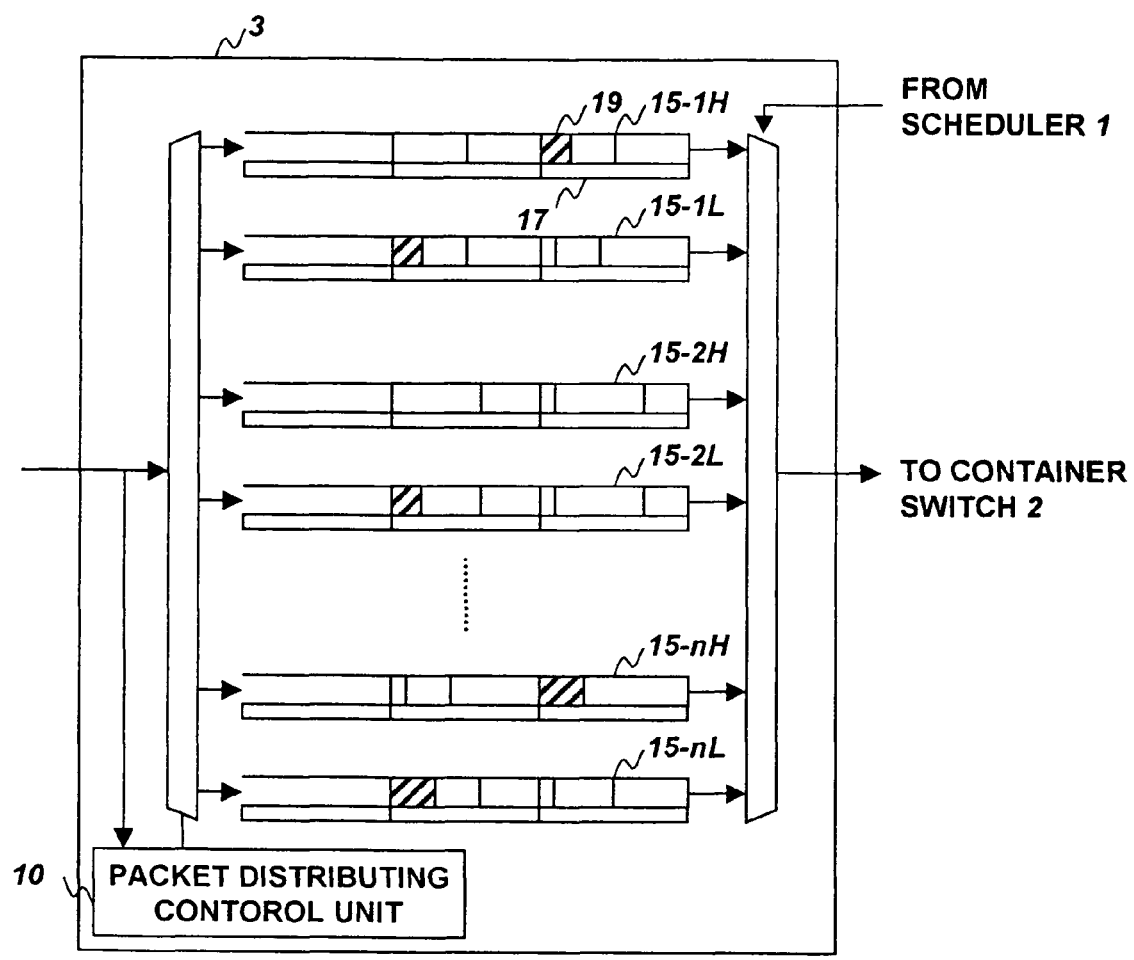
FIG. 22 is a schematic view for an input interface of a packet communication device of a second embodiment of the present invention.

A communication device of this embodiment may also perform priority transmission the same as embodiment 1. In this case, as shown in FIG. 22, queues 15 corresponding to not only output interfaces 4 but also priority are provided with input interface 3 like FIG. 2. Schedule 1 performs the scheduling for container transmission according to the priority.

Embodiment 3

Figure 7:
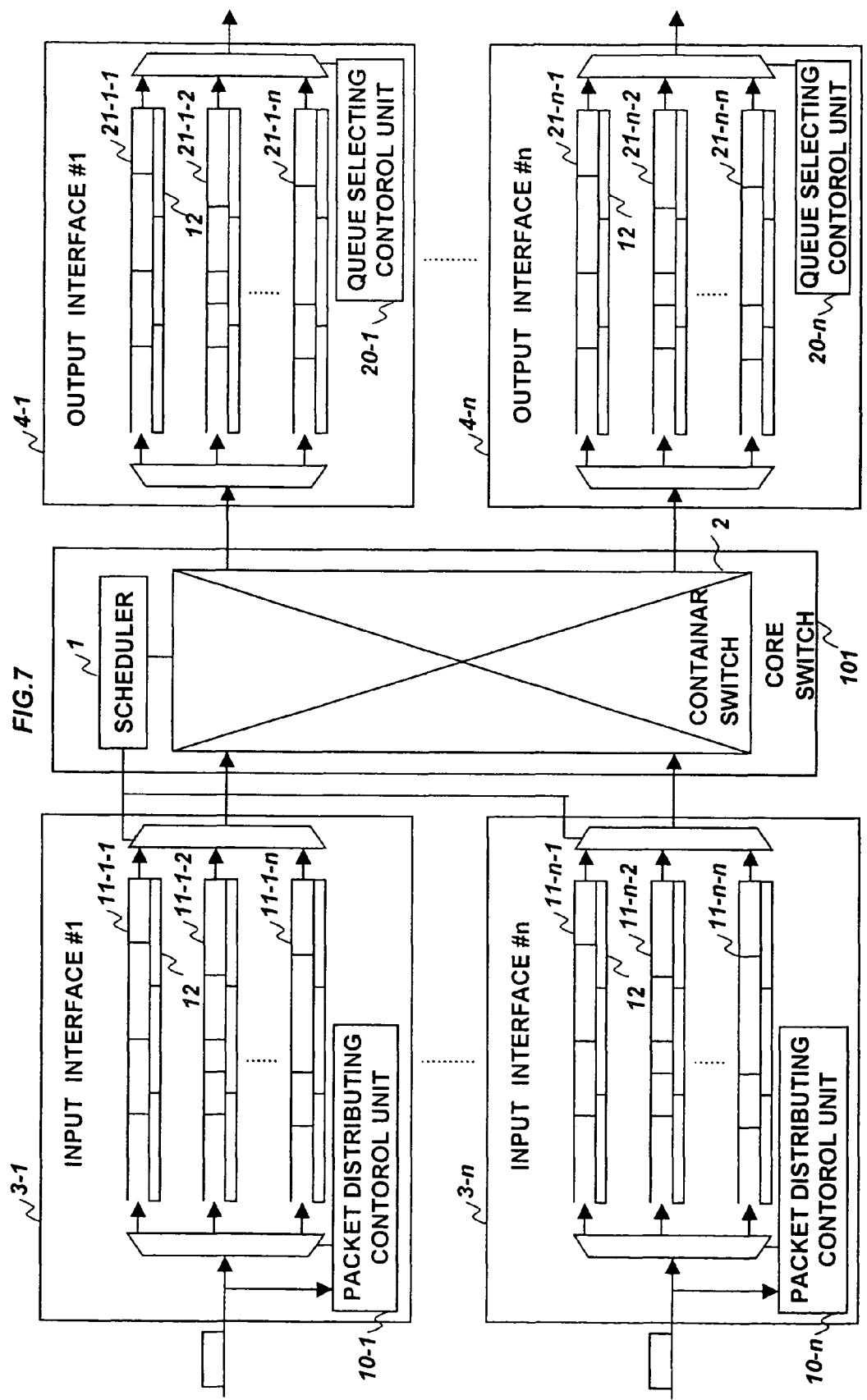
FIG. 7 is a schematic view for a packet communication device of a third embodiment of the present invention.

FIG. 7 is a schematic view for a packet communication device of a third embodiment of the present invention. Since this embodiment also uses switching in container units, this embodiment is effective in parallel processing in the switch with large capacity the same as embodiment 2.

The upper section of each of queues 11 in input interface 3 shows packets and the lower section of each of the queues shows containers 12. In this embodiment, as shown in FIG. 7, a packet extends over two containers. Therefore, each of output interfaces 4 has "n" queues 21 corresponding to input interfaces 3. Herein, the number of "n" is the number of output interfaces 4. This is the main difference between this embodiment and a second embodiment. In this embodiment, it is not always necessary to insert PAD into a container, because packets are stiffed into a container without considering the boundary between packets. Therefore, overhead is reduced. PAD may be inserted, however, to prevent increasing delay, if packets to be transmitted to the same output interface 4 does not arrive for hours.

Figure 12:
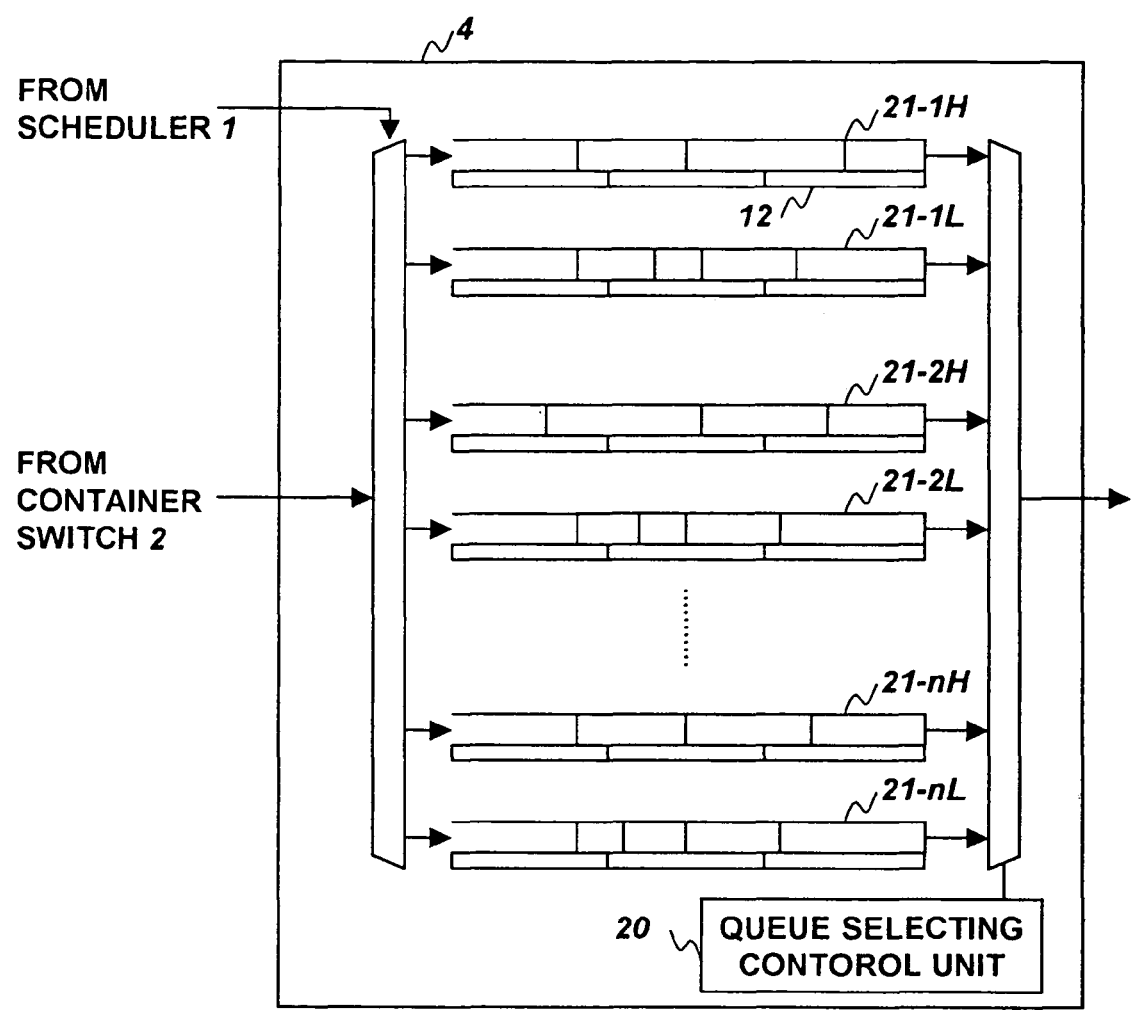
FIG. 12 is a schematic view for an output interface of a packet communication device of a third embodiment of the present invention.

In this embodiment, as shown in FIG. 12, queue selecting control unit 20 is providing with output interface 4. Queue selecting control unit 20 selects one of the queues 21 and transmits the packet queued in it to transmission path.

Figure 8:
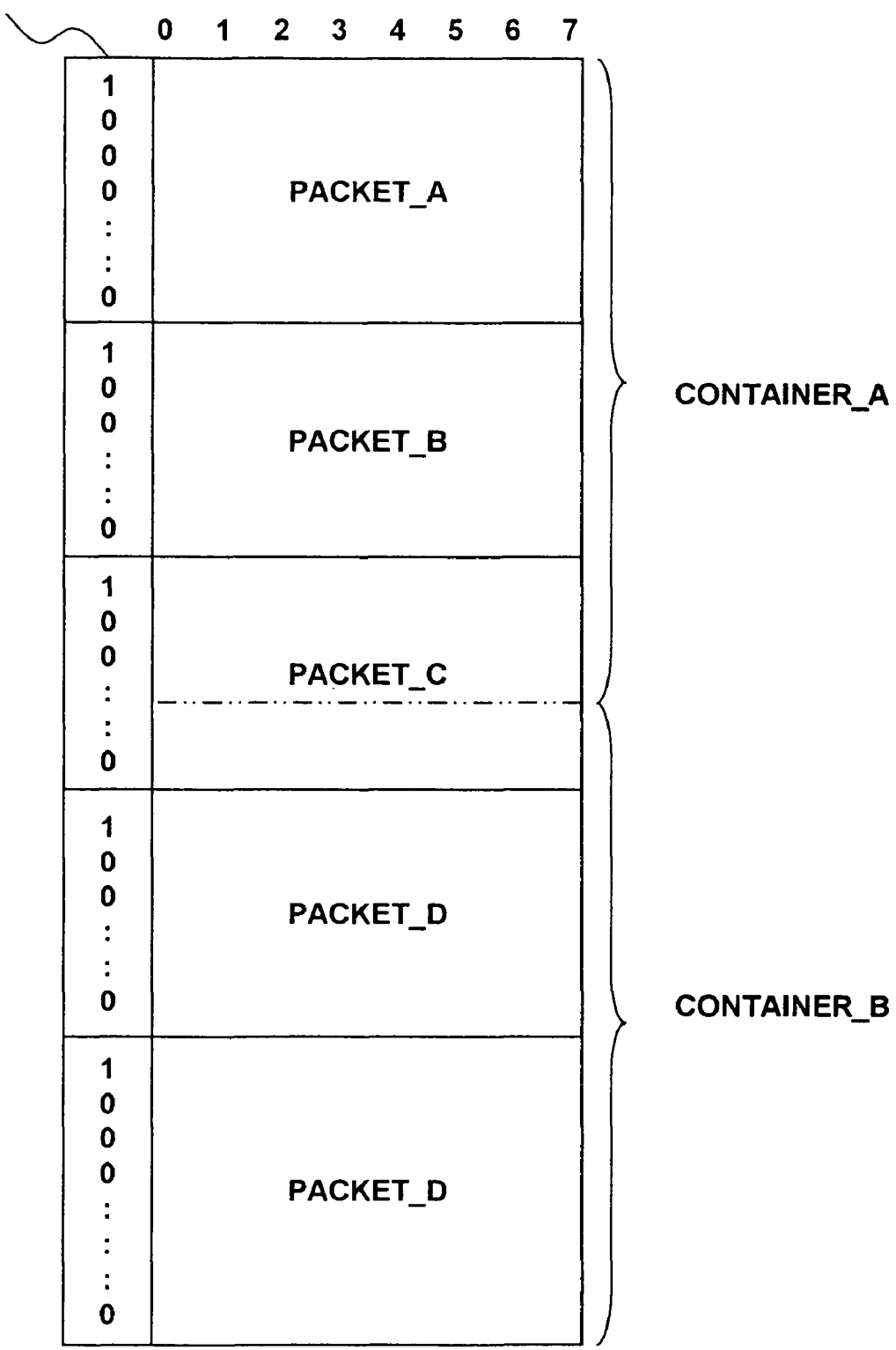
FIG. 8 is a container format used by a packet communication device of third embodiment of the present invention.

FIG. 8 shows a container format used by a packet communication device of third embodiment of the present invention. FIG. 8 shows the case that packet_C extends over container_A and container_B. Both of the function of discrimination flag 31 and the way to set discrimination flag 31 is the same as that shown in FIG. 4.

Figure 9:
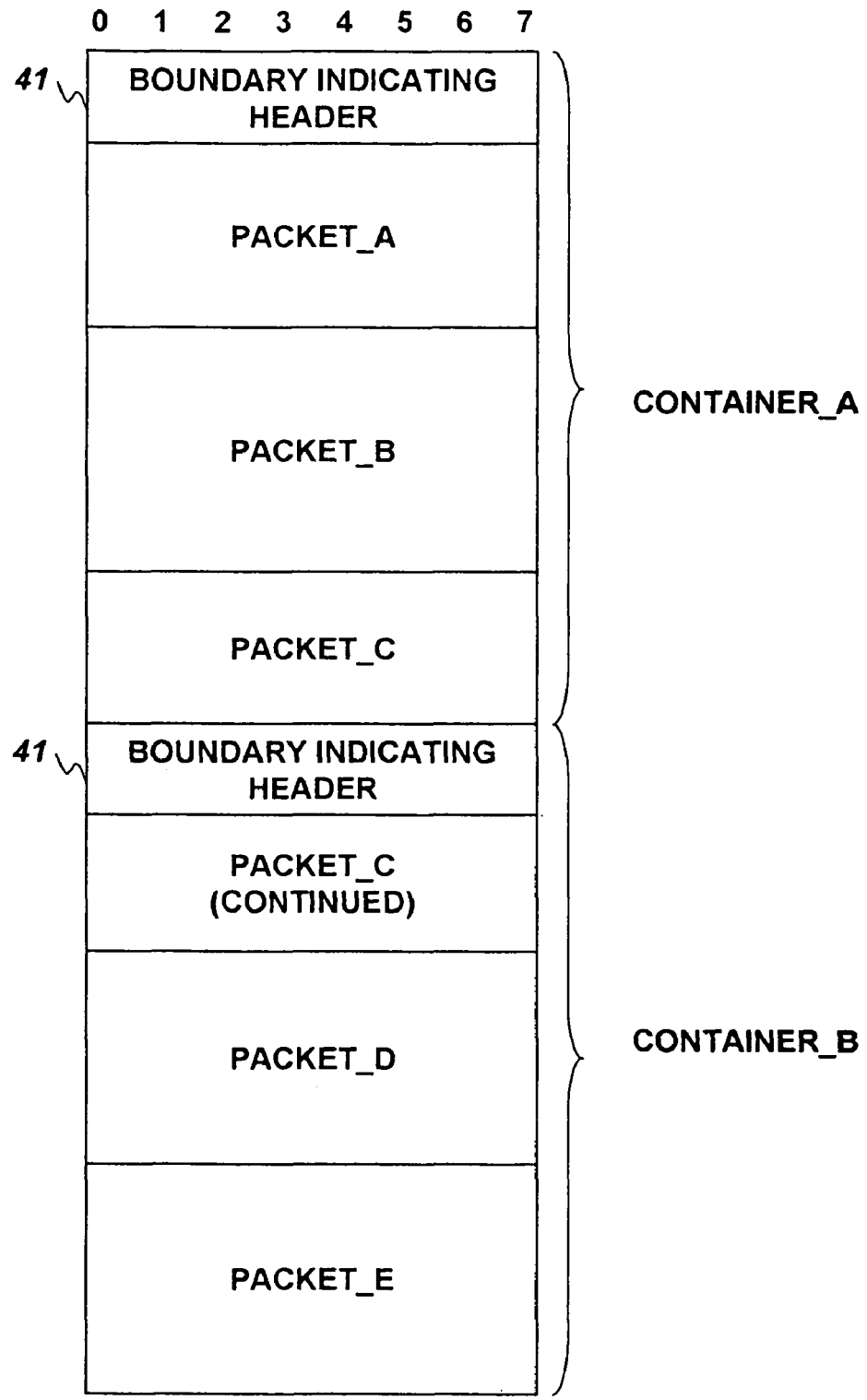
FIG. 9 is another container format used by a packet communication device of third embodiment of the present invention.

FIG. 9 is another container format used by a packet communication device of third embodiment of the present invention. FIG. 9 shows the case that packet_C extends over container_A and container_B. Both of the function of discrimination flag 31 and the way to set discrimination flag 31 is the same as that shown in FIG. 5.

Using code violation like PPP (Point to point protocol) also may attain the discrimination the same as embodiment 2.

Figure 10:
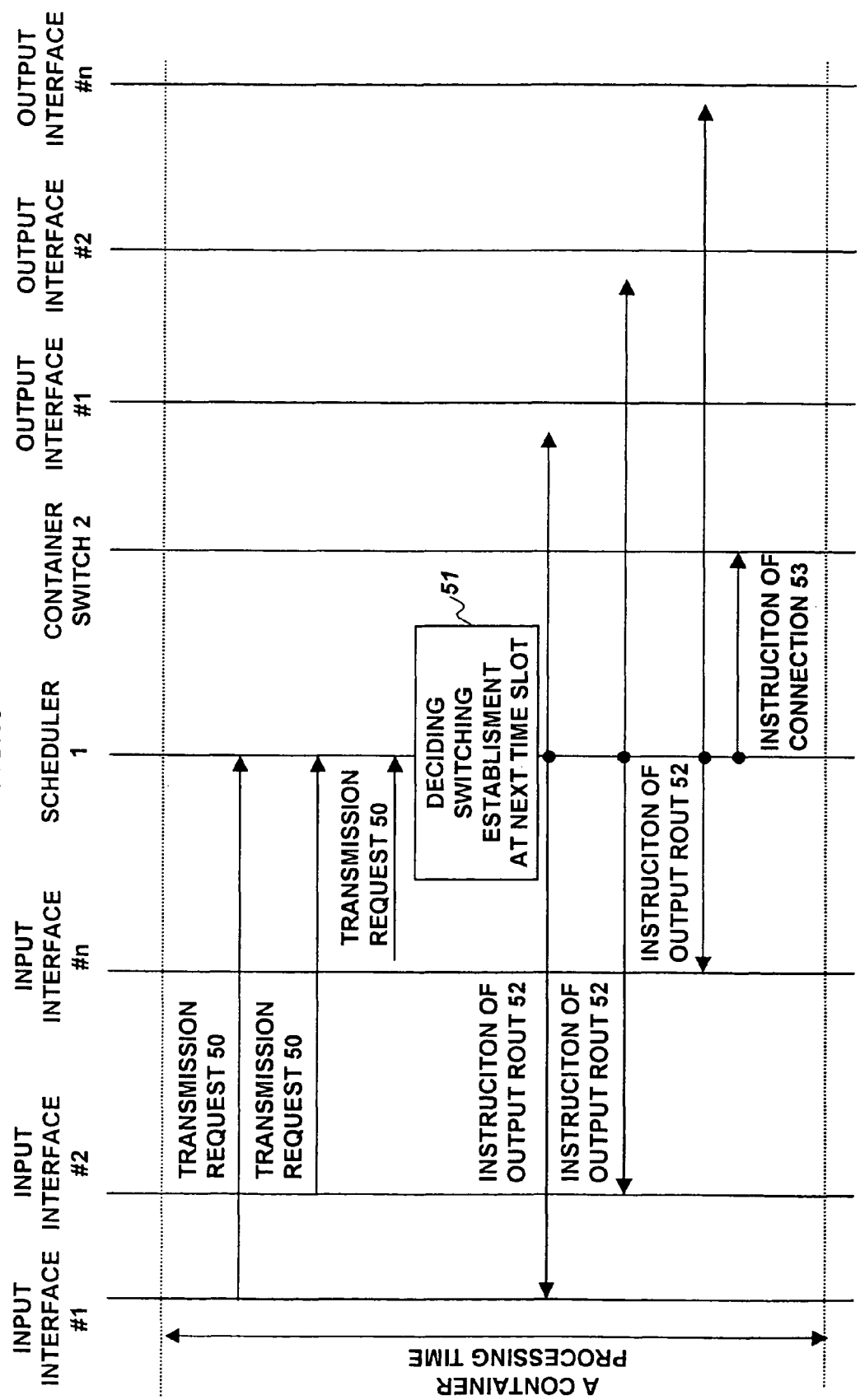
FIG. 10 is a time chart of switching of a packet communication device of a third embodiment of the present invention

FIG. 10 shows a time chart of switching of a packet communication device of a third embodiment of the present invention. The difference between this time chart and that shown in FIG. 6 is that instruction of output rout 52 is transmitted to not only input interface 3 but also output interface 4. Moreover, in stead of the above, scheduler may perform predetermined scheduling (pre-scheduling system) like embodiment 2.

Figure 11:
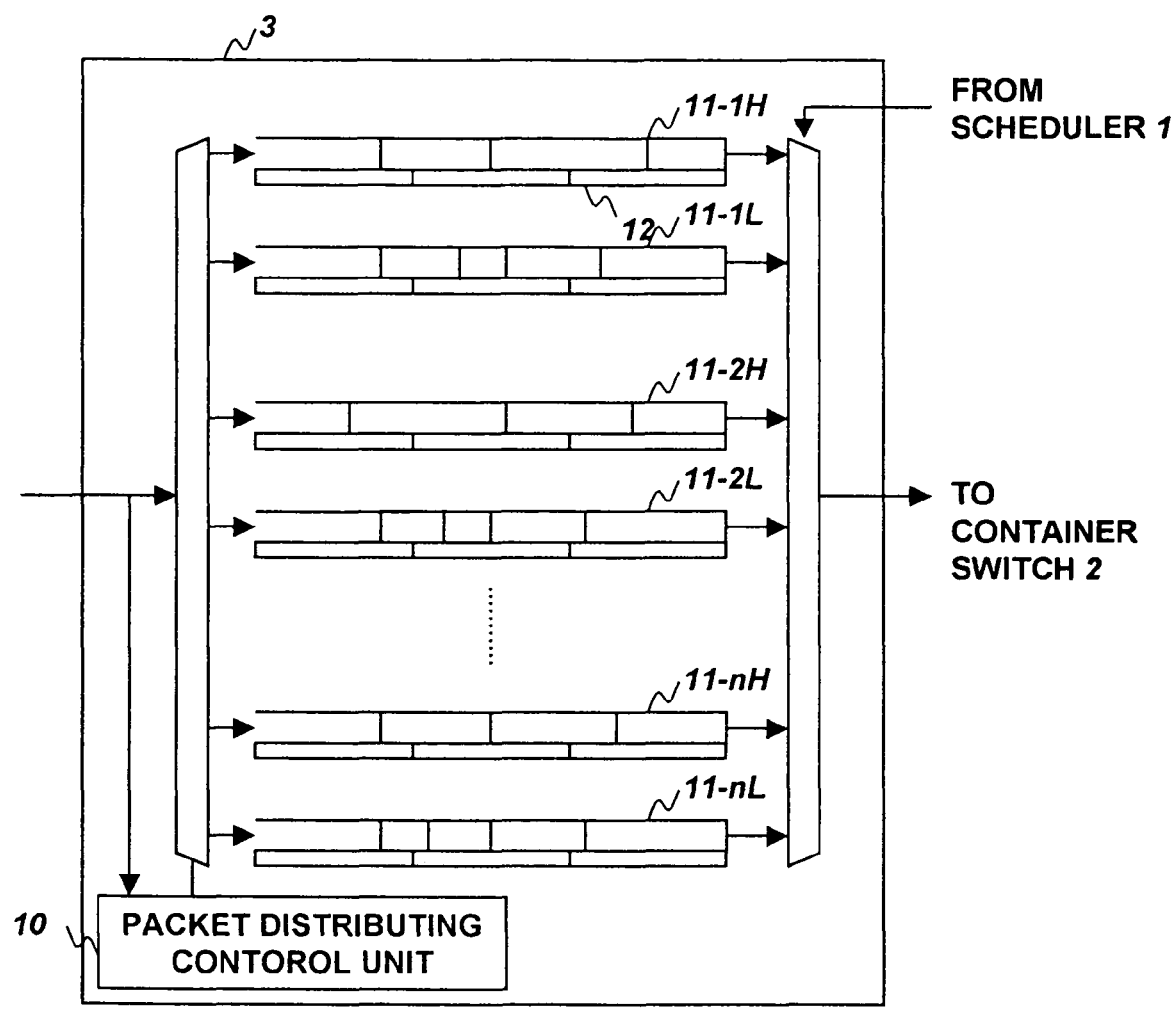
FIG. 11 is a schematic view for an input interface of a packet communication device of a third embodiment of the present invention.

A communication device of this embodiment may also perform priority transmission the same as embodiment 1 and embodiment 2. FIG. 11 shows input interface 3 having queues 11 corresponding to not only output interfaces 4 but also priority like FIG. 22. In this embodiment, if input interface 3 has queues corresponding to priority, output interface 4 also has ones. FIG. 11 shows output interface 4 having queues 21 corresponding to not only input interfaces 4 but also priority.

As above, the present invention is suitable for a packet communication device with large capacity can be attained low cost by the present invention.

Although the present invention has been described in connection with a preferred embodiment thereof, many other variations and modifications will now become apparent to those skilled in the art.

What is claimed is:

1. A router for switching a variable length packet, comprising:
   a plurality of input interfaces,
   a plurality of output interfaces, and
   a switch, wherein
   the variable length packet comprises header information including information corresponding to a destination output interface that is one of the output interfaces,
   each of the plurality of input interfaces divides the variable length packet into a plurality of fixed length cells, generates an internal switching information based on a header information, transmits the internal switching information to the switch separately to a transmission of the cells, and after said transmitting, transmits the cells to the switch without providing any destination information, wherein the internal switching information includes a packet length of cells in which the packet is segmented, and the switch transmits the cells to one of the output interfaces to which said internal switching information is transmitted, and holds cells transferred from another input interface to another destination output interface until completing the transmission of said cells to the destination output interface, and wherein the switch completes the transmission of said cells to the destination output interface based on the packet length of cells in which the packet is segmented which is included in the internal switching information.

2. The router according to claim 1, wherein the switch switches cells to be transferred from another of the input interfaces to one of the output interfaces that is different from the destination output interface.

3. The router according to claim 2, wherein the switch is a crossbar switch.

4. The router according to claim 1, wherein the switch discards the internal switching information after said switching is completed.

5. The router according to claim 1, wherein each of the input interfaces adds sequence number to the cells.

6. The router according to claim 1, wherein said transmitting the internal switching information to the switch and said transmitting the cells to the switch are performed through different paths.

7. The router according to claim 1, further comprising:

a scheduler which receives the internal switching information from each of the input interfaces, monitors communication condition of each of the output interfaces, generates switching control information based on the internal switching information and the communication condition, and transmits the switching control information to the switch.

8. The router according to claim 1, wherein each of the input interfaces has a plurality of queues corresponding to the plurality of output interfaces respectively and each of the input interfaces distributes the variable length packet to either the first queue or the second queue based on the header information.

9. The router according to claim 1, wherein:

each of the input interfaces has a first queue for a first variable length packet that is the variable length packet with a first priority and a second queue for a second variable length packet that is the variable length packet with a second priority, each of the input interfaces distributes the variable length packet to either the first queue or the second queue based on the header information, and if the first variable length packet and the second variable length packet have the same destination output interface, then each of the input interfaces transfers the first variable length packet prior to the second variable length packet.

10. The router according to claim 9, wherein the variable length packet is an IP (internet protocol) packet and each of said input interfaces performs decisions based on an information of TOS (type of service) field of the IP packet.

* * * * *